(12) United States Patent
Park et al.

(10) Patent No.: US 10,146,341 B2
(45) Date of Patent: Dec. 4, 2018

(54) ELECTRONIC APPARATUS AND METHOD FOR DISPLAYING GRAPHICAL OBJECT THEREOF

(71) Applicant: Samsung Electronics Co., Ltd., Suwon-si, Gyeonggi-do (KR)

(72) Inventors: Da-hye Park, Suwon-si (KR); Pil-seung Yang, Seoul (KR); Seol-hye Won, Seoul (KR); Jin-young Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/942,371

(22) Filed: Nov. 16, 2015

(65) Prior Publication Data
US 2016/0154474 A1 Jun. 2, 2016

(30) Foreign Application Priority Data

Nov. 28, 2014 (KR) .......................... 10-2014-0168323

(51) Int. Cl.
*G06F 3/038* (2013.01)
*G06F 3/0354* (2013.01)
*G06F 3/041* (2006.01)
*G06F 3/0484* (2013.01)
*G06F 3/0488* (2013.01)
*G06F 1/16* (2006.01)

(52) U.S. Cl.
CPC ............ *G06F 3/038* (2013.01); *G06F 1/1643* (2013.01); *G06F 3/03545* (2013.01); *G06F 3/0416* (2013.01); *G06F 3/0488* (2013.01); *G06F 3/04845* (2013.01); *G06F 3/04883* (2013.01); *G06F 2200/1614* (2013.01)

(58) Field of Classification Search
None
See application file for complete search history.

(56) References Cited

U.S. PATENT DOCUMENTS

| | | |
|---|---|---|
| 2012/0327042 A1 | 12/2012 | Harley et al. |
| 2013/0088465 A1 | 4/2013 | Geller et al. |
| 2014/0022218 A1 | 1/2014 | Parekh et al. |

(Continued)

FOREIGN PATENT DOCUMENTS

| | | |
|---|---|---|
| JP | 5-250090 A | 9/1993 |
| JP | 2009-237836 A | 10/2009 |
| KR | 10-1155349 B1 | 6/2012 |

OTHER PUBLICATIONS

European Office Action dated Aug. 17, 2017, issued in the European Application No. 15863317.2.

*Primary Examiner* — Benjamin C Lee
*Assistant Examiner* — Krishna Neupane
(74) *Attorney, Agent, or Firm* — Jefferson IP Law, LLP

(57) ABSTRACT

An electronic apparatus is provided. The electronic apparatus includes a sensor configured to sense an input of a touch pen and output a signal corresponding to the input of the touch pen, a display configured to include a first layer and a second layer, display a graphical object in the first layer, and display a handwriting image based on the input of the touch pen in the second layer, and a controller configured to control the display to change a display direction of the graphical object displayed in the first layer based on the signal output from the sensor.

20 Claims, 27 Drawing Sheets

(56) References Cited

U.S. PATENT DOCUMENTS

| | | | |
|---|---|---|---|
| 2014/0033056 A1* | 1/2014 | Kim | G06F 3/0484 715/738 |
| 2014/0210730 A1* | 7/2014 | Mankowski | G06F 3/041 345/173 |
| 2014/0362002 A1* | 12/2014 | Nakasu | G06F 3/0488 345/173 |
| 2016/0139690 A1* | 5/2016 | Chang | G06F 3/0383 345/179 |
| 2016/0147418 A1* | 5/2016 | Andoh | G06F 3/04845 345/173 |

* cited by examiner

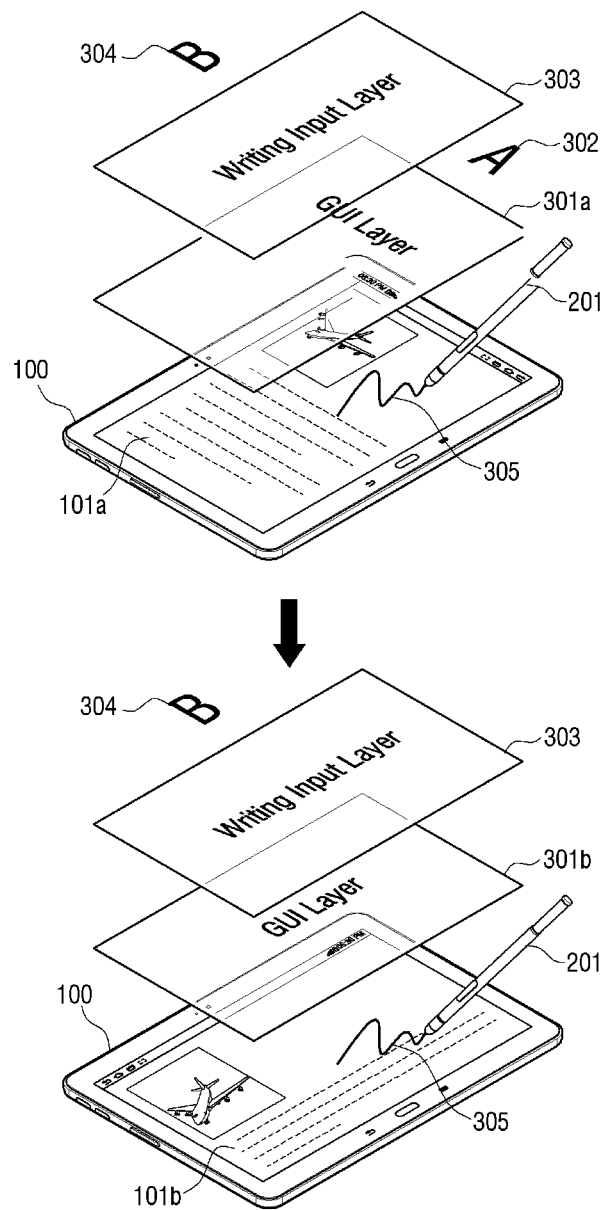

TEXTUALIZATION

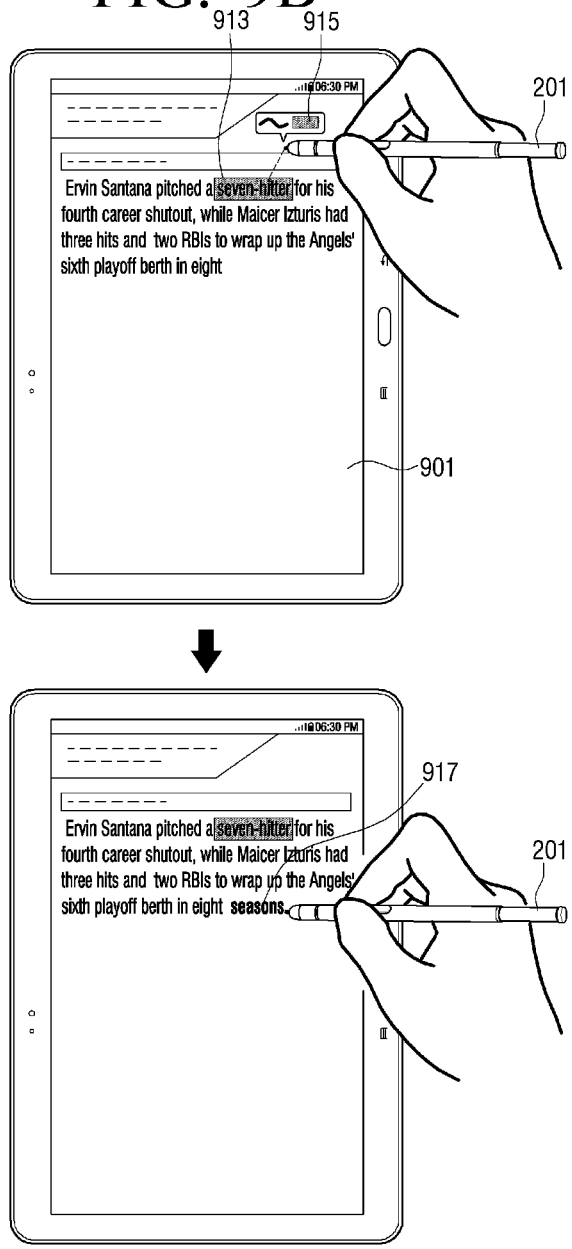

ELECTRONIC APPARATUS AND METHOD FOR DISPLAYING GRAPHICAL OBJECT THEREOF

CROSS-REFERENCE TO RELATED APPLICATION(S)

This application claims the benefit under 35 U.S.C. § 119(a) of a Korean patent application filed on Nov. 28, 2014 in the Korean Intellectual Property Office and assigned Serial number 10-2014-0168323, the entire disclosure of which is hereby incorporated by reference.

TECHNICAL FIELD

The present disclosure relates to an electronic apparatus and a method for displaying a graphical object thereof.

BACKGROUND

With the recent increase in the popularity of a portable terminal, there is a growing need for a method of intuitionally performing an input/output operation. However, a size of an electronic apparatus, such as, the portable terminal, is limited for portability, and thus, a size of a display for displaying information is relatively small as compared with a display of a common television (TV), a monitor, etc. For this reason, an input method of the portable terminal has developed from a user interface (UI) method of the related art of using an input means, such as, a keyboard, a keypad, a mouse, etc., into an intuitional UI method of inputting information by using a voice or directly touching a screen with a hand or a touch pen for various users. Specially, a user is able to perform more accurate touch or input a handwriting by using a touch pen. A direction of the handwriting may differ from a display direction of a graphical object. Accordingly, there is a desire for diverse methods for automatically arranging the direction of handwriting using a touch pen to correspond to the display direction of the graphical object.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic apparatus and a method for displaying a graphical object thereof, and more particularly, to a method of recognizing a handwriting direction by using an angle between a touch pen and a display and automatically changing a display direction of a graphical object displayed in the display to a horizontal direction or a vertical direction based on the handwriting direction.

In accordance with an aspect of the present disclosure, an electronic apparatus is provided. The electronic apparatus includes a communicator configured to receive a signal from an external source, a display configured to display a graphical object, a sensor configured to sense an input of a touch pen and output a signal corresponding to the input of the touch pen, and a controller configured to determine a display direction of the graphical object displayed in the display based on the signal output from the sensor. The controller may determine tilt information of the touch pen based on the signal. The controller may receive a signal output from the touch pen through the communicator and determine the tilt information of the touch pen based on the signal output from the touch pen. The controller may determine a tilt direction of the touch pen based on tilt information of the touch pen and determine the display direction of the graphical object based on the tilt direction of the touch pen. The controller may control the display to change the display direction of the graphical object so that the tilt direction of the touch pen and the display direction of the graphical object become opposite to each other. The controller may control the display to display the graphical object in a first layer and display a handwriting image displayed based on the input of the touch pen in a second layer. The controller may control the display to fix the second layer and change the display direction of the graphical object in the first layer based on the tilt direction of the touch pen.

In accordance with another aspect of the present disclosure, an electronic apparatus is provided. The electronic apparatus includes a sensor configured to sense an input of a touch pen and output a signal corresponding to the input of the touch pen, a display configured to include a first layer and a second layer, display a graphical object in the first layer, and display a handwriting image based on the input of the touch pen in the second layer, and a controller configured to control the display to change a display direction of the graphical object displayed in the first layer based on the signal output from the sensor. The controller may determine a tilt direction of the touch pen based on the signal output from the sensor and control the display to change the display direction of the graphical object displayed in the first layer according to the tilt direction of the touch pen. The controller may control the display to maintain a direction of the second layer without change despite a direction of the first layer being changed.

In accordance with another aspect of the present disclosure, a method for displaying a graphical object of an electronic apparatus is provided. The method includes displaying a graphical object in a display, sensing an input of a touch pen, and changing a display direction of the graphical object displayed in the display based on the input of the touch pen. The changing the display direction of the graphical object may include determining tilt information of the touch pen based on a signal corresponding to the input of the touch pen.

The method may further include receiving a signal output from the touch pen. The tilt information of the touch pen may be determined based on the signal. The changing of the display direction of the graphical object may include determining a tilt direction of the touch pen based on tilt information of the touch pen and determining the display direction of the graphical object based on the tilt direction of the touch pen. The changing of the display direction of the graphical object may include changing the display direction of the graphical object so that the tilt direction of the touch pen and the display direction of the graphical object become opposite to each other. The method may further include displaying a handwriting image based on the input of the touch pen. The graphical object may be displayed in a first layer, and the handwriting image displayed based on the input of the touch pen may be displayed in a second layer. The changing of the display direction of the graphical object may include fixing the second layer and changing the display direction of the graphical object in the first layer based on the tilt direction of the touch pen.

In accordance with another aspect of the present disclosure, a method for displaying a graphical object of an electronic apparatus is provided. The method includes displaying a graphical object in a first layer, sensing an input of a touch pen, displaying a handwriting image in a second layer based on the input of the touch pen, and changing a display direction of the graphical object displayed in the first layer based on the input of the touch pen. The changing of the display direction of the graphical object may include determining a tilt direction of the touch pen based on the input of the touch pen and changing the display direction of the graphical object displayed in the first layer according to the tilt direction of the touch pen. The method may further include maintaining a direction of the second layer without change despite the display direction of the graphical object being changed.

According to the above-described various embodiments, a method for displaying a graphical object of an electronic apparatus changes a display direction of a graphical object automatically based on a handwriting direction, thereby providing a user with convenience.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 3A and 3B are views illustrating a handwriting input layer and a graphical object display layer according to an embodiment of the present disclosure;

FIGS. 9A and 9B are views provided to describe a method for applying a format by using the touch pen according to an embodiment of the present disclosure;

Throughout the drawings, it should be noted that like reference numbers are used to depict the same or similar elements, features, and structures.

DETAILED DESCRIPTION

Figure 1:
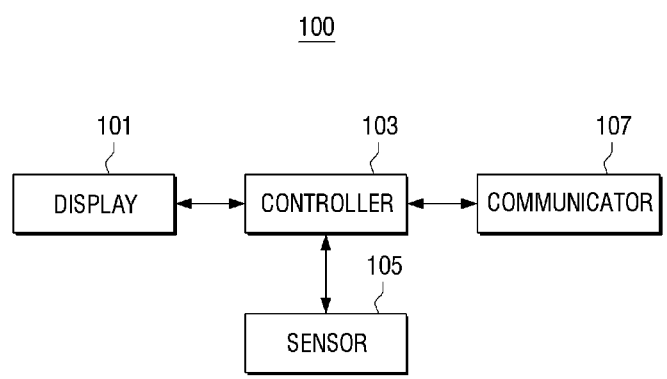
FIG. 1 is a block diagram illustrating a structure of an electronic apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms 'include' and 'may include' used in the following descriptions refer to the disclosed function, operation, or element and do not limit any additional one or more functions, operations, or elements. In addition, in the present disclosure, the terms 'include' and 'have' show existence of a feature, number, operation, element, part, or combination thereof disclosed herein and are not intended to exclude the possibilities of combination or addition of one or more features, numbers, operations, elements, parts or combination thereof.

The term 'or' in the following descriptions includes all forms of combinations of the words used with the term. For example, 'A or B' may include A, may include B, or may include both of A and B.

In the present disclosure, relational terms, such as 'first' and 'second,' may modify various elements but do not limit the elements. For example, the terms are used to distinguish one entity from another entity, without necessarily implying any actual relationship or order between such entities. For example, both of the first user device and the second user device refer to a user device and represent distinct user devices, respectively. As an example, the first element may be called the second element without deviating from the scope of right of the present disclosure, and vice versa.

When it is described that an element is 'connected' to another component, the element may be connected to another element directly, but in this case, it may be understood that any other element may exist between the element and another element. By contrast, when it is described that an element is 'directly connected' to another element, it may be understood that any other element does not exist between the element and another element.

Unless otherwise defined, all terms used in the following descriptions, including technical or scientific terms, have the same meaning as commonly being understood by a person having ordinary skill in the art to which the present disclosure pertains (hereinafter referred to as 'those skilled in the art'). The terms defined in a common dictionary should be interpreted as the contextual meaning in the related art. Unless obviously defined that way herein, the terms do not understood as an ideal or excessively formal meaning.

In the following descriptions, 'module' or 'unit' performs at least one function or operation and may be realized as hardware, software, or combination thereof. In addition, a plurality of 'modules' or 'units' may be integrated into at least one module and may be realized as at least one processor (not shown) except for 'module' or 'unit' that needs to be realized as specific hardware.

Hereinafter, the various embodiments of the present disclosure will be described in detail with reference to the accompanying drawings. In the following description, like drawing reference numerals are used for the like elements, even in different drawings, and the overlapped description will be omitted.

FIG. 1 is a block diagram illustrating a structure of an electronic apparatus 100 according to an embodiment of the present disclosure.

Referring to FIG. 1, the electronic apparatus 100 may include a display 101, a controller 103, a sensor 105, and a communicator 107. The display 101 may display a graphical object and perform a display function with respect to output information output from the electronic apparatus 100. The graphical object may be a moving image, a still image, an electronic book (E-book) screen, a web page, a content, and a graphic user interface (GUI).

The sensor 105 may perform various input functions by a user. In addition, the sensor 105 may sense diverse inputs including a single-touch input, a multi-touch input, a drag input, a handwriting input, or a drawing input of the user by using a variety of objects, such as, a finger, a pen, etc. The sensor 105 may be provided in a form of a module realized as a single body with the display 101. In addition, the sensor 105 may be realized by using one panel which is capable of sensing both of an input of a finger and an input of a touch pen 201 or may be realized by using two panels, such as, a touch panel of sensing a finger input and a touch pen recognition panel of sensing a touch pen input. Hereinafter, there is provided the description on an example of the sensor 105 realized with two panels, the touch panel of sensing a finger input and the touch pen recognition panel of sensing a touch pen input.

The display 101 may be a panel such as liquid crystal display (LCD), active matrix organic light emitting diodes (AMOLED), etc. The display 101 may display diverse screens according to various operational statuses, execution of an application, and a service of the electronic apparatus 100. The display 101 may include a touch panel. The touch panel may occupy a certain space in a lower part of the display 101. For example, the touch panel may occupy a space to cover a display area of the display 101.

The touch panel may sense a user touch input. For example, the touch panel may be realized as a touch film, a touch sheet, a touch pad, etc. The touch panel senses a touch input and outputs a touch event value corresponding to the sensed touch signal. In this case, information on the sensed touch signal may be displayed in the display 101. The touch panel may receive a manipulation signal according to the user touch input through various input means. For example, the touch panel may sense a touch input using a user body (for example, a finger) or a physical tool. According to an embodiment, the touch panel may be realized as a capacitive-type touch panel. In case of the capacitive-type touch panel, the touch panel consists of a glass of which both surfaces are coated with thin metal conducting material (for example, indium tin oxide (IPO)) for enabling a current to flow along the surfaces of the glass and is coated with a dielectric substance for storing a charge. In response to a surface of the touch panel being touched by an object, a certain amount of charges move to a contact point by static electricity. The touch panel recognizes variation of the current according to the movement of the charge to sense a touched point and tracks a touch event. In this case, the touch event occurred in the touch panel may be generated by a finger of a human being in many cases but may be generated by other object which may cause change of capacitance, for example, a conductive object which may cause change of capacitance.

The touch pen recognition panel senses an access input or touch input of the touch pen 210 using a pen for touch of the user (for example, a stylus pen, a digitizer pen, etc.) and outputs a touch pen access event or a touch pen touch event. The touch pen recognition panel may be realized in an electro-magnetic resonance (EMR) method. In addition, the touch pen recognition panel may sense a touch input or an access input according to variation of strength of an electromagnetic field by the access or touch of the touch pen 201. To be specific, the touch pen recognition panel may include an electromagnetic induction coil sensor (not shown) having a grid structure where a plurality of loop coils are respectively arranged in a predetermined first direction and a second direction which intersects the first direction and an electronic signal processor (not shown) which sequentially supplies alternating current (AC) signals having a certain frequency to the respective loop coils of the electromagnetic induction coil sensor. In response to the touch pen 201 in which a resonant circuit is embedded being located around the loop coils of the touch pen recognition panel, a magnetic field transmitted from the loop coils generates the current based on mutual electromagnetic induction in the resonant circuit in the touch pen 201. According to the generated current, an induction magnetic field is generated from the coils constituting the resonant circuit in the touch pen 201. The touch pen recognition panel detects the induction magnetic field from a loop coil in a signal receiving status and senses an access position or a touch position of the touch pen 201. The touch pen recognition panel may sense an access or touch of an object which may generate the current based on the electromagnetic induction. According to an embodiment, the touch pen recognition panel is exclusively used for the recognition on the access or touch of the touch pen 201. The touch pen recognition panel may be installed at a certain position of a terminal and may have an activated state by occurrence of a particular event or by default. In addition, the touch pen recognition panel may occupy a certain space in the lower part of the display 101. For example, the touch pen recognition panel may occupy a space to cover a display area of the display 101.

The communicator 107 may receive a signal from an external source of the electronic apparatus 100. Specially, in case of the electronic apparatus 100 supporting a mobile communication function, the communicator 107 may include a mobile communication module. The communicator 107 may perform particular functions of the electronic apparatus 100 requiring a communication function, for example, a chat function, a message transmission/reception function, a call function, etc. In addition, the communicator 107 may receive a signal from an external device such as the touch pen 201. The touch pen 201 may transmit information on a tilt of the touch pen 201 to the electronic apparatus 100 through the communicator 107.

The controller 103 includes various elements for receiving an input of the handwriting using the touch pen 201 and displaying the received handwriting. The controller 103 may control a signal processing operation, a data processing operation, and other functions for the handwriting input based on the elements. For example, the controller 103 may provide a displayed application with a handwriting input layer and control the display 101 to convert a handwriting image input by the user into text on the provided handwriting input layer and insert and display the text into an input filed.

The controller 103 may determine a display direction of a graphical object displayed in the display 101 based on a signal output from the sensor 105 in response to the touch pen input being input into the display 101. To be specific, the controller 103 may determine tilt information of the touch pen 201 based on the signal output from the sensor 105. The tilt information of the touch pen 201 may be an angle between the display 101 and the touch pen 201 and a tilt direction of the touch pen 201.

The touch pen 201 may output the information on the tilt angle and the tilt direction of the touch pen 201 in a form of a signal. In this case, the controller 103 may receive the signal output from the touch pen 201 through the communicator 107 and determine the tilt information of the touch pen 201 based on the signal output from the touch pen 201.

The controller 103 may determine a tilt direction of the touch pen 201 based on the tilt information of the touch pen 201 and determine the display direction of the graphical object based on the tilt direction of the touch pen 201. In addition, the controller 103 may control the display 101 to change the display direction of the graphical object so that the tilt direction of the touch pen 201 and the display direction of the graphical object become opposite to each other.

The controller 103 may control the display 101 to display the graphical object in a first layer and display a handwriting image displayed based on the touch pen input in a second layer.

The controller 103 may control the display 101 to fix the second layer and change the display direction of the graphical object in the first layer based on the tilt direction of the touch pen 201.

The controller 103 may control the display 101 to change the display direction of the graphical object displayed in the first layer based on the signal output from the sensor 105. In addition, the controller 103 may determine the display direction of the graphical object displayed in the first layer based on the signal output from the sensor 105. The controller 103 may determine the tilt direction of the touch pen 201 based on the signal output from the sensor 105 and control the display 101 to change the display direction of the graphical object displayed in the first layer according to the tilt direction of the touch pen 201.

Figure 2A:
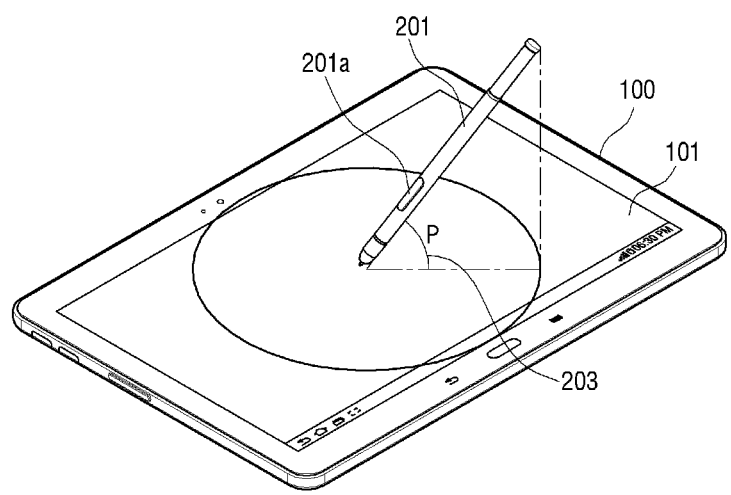
FIGS. 2A and 2B are views provided to describe an embodiment of changing a display direction of a graphical object according to a tilt direction of the touch pen according to an embodiment of the present disclosure.
Figure 2B:
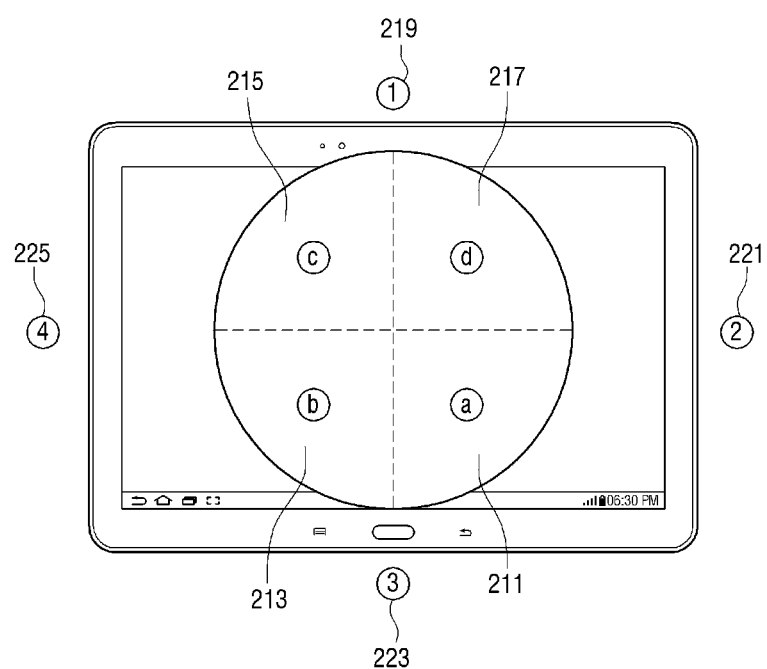

FIGS. 2A and 2B are views provided to describe an embodiment of changing a display direction of a graphical object according to a tilt direction of the touch pen 201 according to an embodiment of the present disclosure.

Referring to FIGS. 2A and 2B, FIG. 2A illustrates the electronic apparatus 100, the display 101, and the touch pen 201. In response to the touch pen 201 coming into contact with the display 101, the controller 103 may determine a contact point of the touch pen 201 and an angle (P) 203 between the touch pen 201 and the display 101. That is, the controller 103 may determine the tilt direction of the touch pen 201.

FIG. 2B illustrates the tilt direction of the touch pen 201 and a display direction according to the tilt direction. In response to the touch pen 201 coming into contact with the display 101, the controller 103 may determine a direction to which the touch pen 201 tilts among four directions of upward, downward, right, and left directions 211, 213, 215, 217, with reference to a center of the display 101. Subsequently, the controller 103 may determine display directions of the graphical object 219, 221, 223, 225 based on the tilt direction of the touch pen 201 and control the display 101 to rotate a screen. That is, the controller 103 may control the display 101 to change the display direction of the graphical object.

For example, in response to the touch pen 201 tilting in 'a' direction 211, the controller 103 may determine the display direction of the graphical object as a first direction 219 and control the display 101 to rotate the screen based on the determined display direction. In response to the touch pen 201 tilting in 'b' direction 213, the controller 103 may determine the display direction of the graphical object as a second direction 221 and control the display 101 to rotate the screen based on the determined display direction. In response to the touch pen 201 tilting in 'c' direction 215, the controller 103 may determine the display direction of the graphical object as a third direction 223 and control the display 101 to rotate the screen based on the determined display direction. In response to the touch pen 201 tilting in 'd' direction 217, the controller 103 may determine the display direction of the graphical object as a fourth direction 225 and control the display 101 to rotate the screen based on the determined display direction.

The controller 103 may differently determine the display direction based on the tilt direction of the touch pen 201 according to whether a user hand holding the touch pen 201 is a left hand or a right hand. For example, in response to the touch pen 201 tilting in the 'a' direction 211 as the user brings the touch pen 201 into contact with the display 101 by a left hand, the controller 103 may determine the display direction of the graphical object as the fourth direction 225 and control the display 101 to rotate the screen based on the determined direction. In response to the touch pen 201 tilting in the 'b' direction 213 as the user brings the touch pen 201 into contact with the display 101 by the left hand, the controller 103 may determine the display direction of the graphical object as the first direction 219 and control the display 101 to rotate the screen based on the determined direction. In response to the touch pen 201 tilting in the 'c' direction 215 as the user brings the touch pen 201 into contact with the display 101 by the left hand, the controller 103 may determine the display direction of the graphical object as the second direction 221 and control the display 101 to rotate the screen based on the determined direction. In response to the touch pen 201 tilting in the 'd' direction 217 as the user brings the touch pen 201 into contact with the display 101 by the left hand, the controller 103 may determine the display direction of the graphical object as the third direction 223 and control the display 101 to rotate the screen based on the determined direction.

In response to the touch pen 201 tilting in the 'a' direction 211 as the user brings the touch pen 201 into contact with the display 101 by a right hand, the controller 103 may determine the display direction of the graphical object as the first direction 219 and control the display 101 to rotate the screen based on the determined direction. In response to the touch pen 201 tilting in the 'b' direction 213 as the user brings the touch pen 201 into contact with the display 101 by the right hand, the controller 103 may determine the display direction of the graphical object as the second direction 221 and control the display 101 to rotate the screen based on the determined direction. In response to the touch pen 201 tilting in the 'c' direction 215 as the user brings the touch pen 201 into contact with the display 101 by the right hand, the controller 103 may determine the display direction of the graphical object as the third direction 223 and control the display 101 to rotate the screen based on the determined direction. In response to the touch pen 201 tilting in the 'd' direction 217 as the user brings the touch pen 201 into contact with the display 101 by the right hand, the controller 103 may determine the display direction of the graphical object as the fourth direction 225 and control the display 101 to rotate the screen based on the determined direction.

The user is able to select whether to use the electronic apparatus 100 in a right-hand mode or in a left-hand mode. In response to the right-hand mode being selected by the user, the controller 103 may determine that the user holds the touch pen 201 by the right hand and determine the display direction of the graphical object accordingly. In response to the left-hand mode being selected by the user, the controller 103 may determine that the user holds the touch pen 201 by the left hand, determine the display direction of the graphical object accordingly, and control the display 101 to rotate the screen based on the determined direction.

In response to none of the right-hand mode and the left-hand mode being selected by the user, the controller 103 may determine whether to use the right-hand mode or user the left-hand mode based on the angle between the touch pen 201 and the display 101 and a traveling direction of the handwriting. For example, in response to the tilt direction of the touch pen 201 being the 'b' direction 213 and the traveling direction of the handwriting being a right direction, the controller 103 may determine to use the left-hand mode. In response to the tilt direction of the touch pen 201 being the 'a' direction 211 and the traveling direction of the handwriting being the right direction, the controller 103 may determine to use the right-hand mode.

In addition, the controller 103 may determine whether to use the right-hand mode or use the left-hand mode based the angle between the touch pen 201 and the display 101 and the contact point of the user hand.

In response to the user using the electronic apparatus 100 by the hand standing it upright, the controller 103 may determine the display direction of the graphical object based on a signal output from a gravity sensor (not shown). However, in response to the user using the electronic apparatus 100 on a table laying it down on its side or using the electronic apparatus 100 by the hand laying it down on its side, it may be difficult for the controller 103 to determine the display direction of the graphical object based on the signal output from the gravity sensor. Accordingly, in this case, the controller 103 may determine the display direction of the graphical object based on the tilt direction of the touch pen 201.

Figure 3A:
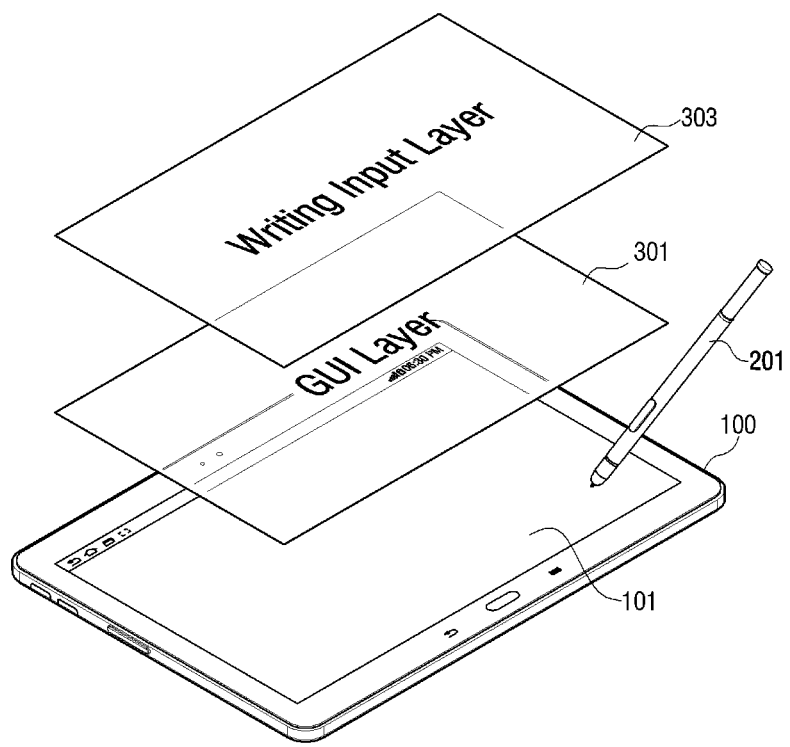

FIGS. 3A and 3B are views illustrating a handwriting input layer and a graphical object display layer according to an embodiment of the present disclosure.

Referring to FIGS. 3A and 3B, FIG. 3A illustrates a graphical object display layer 301, a handwriting input layer 303, and the touch pen 201. In the graphical object display layer 301, a graphic character and image may be displayed. For example, an icon and button for executing a character, a content, and an application may be displayed in the graphical object display layer 301. In the handwriting input layer 303, a handwriting image based on the input of the touch pen 201 may be displayed. The handwriting image may be generated in response to the user moving the touch pen 201 while maintaining the touch of the touch pen 201 with respect to the display 101. The generated handwriting image may be converted into text.

The handwriting input layer 303 may be provided in a transparent form or in a translucent form, for example. The electronic apparatus 100 may receive the handwriting image using the touch pen 201 through the provided handwriting input layer 303. The received handwriting image may be displayed in the handwriting input layer 303. The handwriting image is displayed in the handwriting input layer 303 different from the graphical object display layer 301, and thus, the received handwriting image may be processed separately from the graphical object. That is, the controller 103 may recognize and process the handwriting image displayed in the graphical object display layer 301 as a distinct object. For example, the controller 103 may erase only the handwriting image separately.

FIG. 3B illustrates the electronic apparatus 100, graphical objects 101a, 101b, the graphical object display layer 301, the handwriting input layer 303, a handwriting image 305, and the touch pen 201. The graphical object 101b is the graphical object 101a which rotated 90 degrees.

The electronic apparatus 100 may display the graphical object 101a in the display 101, sense the input of the touch pen 201, and change the display direction of the graphical object displayed in the display 101 based on the input of the touch pen 201. The lower drawing of FIG. 3B illustrates the changed display direction of the graphical object.

In order to change the display direction of the graphical object, the electronic apparatus 100 may determine the tilt information of the touch pen 201 based on a signal corresponding to the input of the touch pen 201. The signal corresponding to the input of the touch pen 201 may be a signal output from the sensor 105 in response to the touch pen 201 coming into contact with the display 101. In addition, the signal corresponding to the input of the touch pen 201 may be a signal generated in the touch pen 201 and may be received through the communicator 107. The electronic apparatus 100 may analyze the signal corresponding to the input of the touch pen 201 and determine the tilt information of the touch pen 201.

The electronic apparatus 100 may determine the tilt direction of the touch pen 201 based on the tilt information of the touch pen 201 and determine the display direction of the graphical object based on the tilt direction of the touch pen 201.

The electronic apparatus 100 may change the display direction of the graphical object so than the tilt direction of the touch pen 201 and the display direction of the graphical object become opposite to each other.

The electronic apparatus 100 may display the handwriting image in the display 101 based on the input of the touch pen 201. In this case, the electronic apparatus 100 may display the graphical object and the handwriting image in different layers, respectively. The electronic apparatus 100 may display the graphical object in the first layer and display the handwriting image displayed based on the input of the touch pen 201 in the second layer. The first layer may be the graphical object display layer 301. The second layer may be the handwriting input layer 303.

The electronic apparatus 100 may fix the second layer and change the display direction of the graphical object in the first layer based on the tilt direction of the touch pen 201.

In addition, the electronic apparatus 100 may display the graphical object in the first layer, sense the input of the touch pen 201, display the handwriting image in the second layer based on the input of the touch pen 201, and change the display direction of the graphical object based on the input of the touch pen 201.

The electronic apparatus 100 may determine the tilt direction of the touch pen 201 based on the input of the touch pen 201 and change the display direction of the graphical object displayed in the first layer based on the tilt direction of the touch pen 201. In addition, the electronic apparatus 100 may maintain a direction of the second layer without change although the display direction of the graphical object is changed.

The upper drawing of FIG. 3B illustrates an example where the display direction of the graphical object and a display direction of the handwriting are misaligned 90 degrees with respect to each other.

The lower drawing of FIG. 3B illustrates an example where the display direction of the graphical object rotates 90 degrees so that the graphical object corresponds to the display direction of handwriting image according to the tilt direction of the touch pen 201.

That is, the upper drawing of FIG. 3B illustrates an example where the touch pen 201 comes into contact with the display 101 while the graphical object 101a is displayed in the display 101 with reference to 'A' direction 302. The graphical object 101a may be displayed in the graphical object display layer 301. In this case, the traveling direction of the handwriting input may be based on 'B' direction 304. The handwriting image 305 may be displayed in the handwriting input layer 303 with reference to the 'B' direction 304. In this case, the handwriting image 305 and the graphical object 101a may be misaligned 90 degrees with respect to each other. That is, the display direction of the graphical object display layer 301 and the handwriting direction of the handwriting input layer 303 are not consistent and misaligned 90 degrees with respect to each other.

In response to the user performing the handwriting by using the touch pen 201 while the graphical object 101a is displayed in the display 101, the handwriting image 305 may be displayed in the handwriting input layer 303. In this case, the display direction of the graphical object 101a is the 'A' direction 302. The handwriting input direction in the handwriting input layer 303 is the 'B' direction 304. The controller 103 may change the display direction of the graphical object 101a based on the handwriting input 'B' direction 304.

That is, the controller 103 may determine an upper direction of the electronic apparatus 100 based on the tilt direction of the touch pen 201 and the traveling direction of the handwriting image and control the display 101 to rotate the graphical object displayed in the graphical object display layer 301a counterclockwise 90 degrees with respect to the electronic apparatus 100. In this case, the controller 103 may fix the handwriting image 305 displayed in the handwriting input layer 303 without rotation. Alternatively, the controller 103 may fix the handwriting input layer 303.

A graphical object display layer 301b illustrated in the lower drawing of FIG. 3B represents a state where the graphical object display layer 301a illustrated in the upper drawing of FIG. 3B rotates counterclockwise 90 degrees. In the lower drawing of FIG. 3B, the graphical object 101b displayed in the display 101 represents a state where the graphical object display layer 101a rotates counterclockwise 90 degrees. In response to the graphical object 101a rotating and being displayed, the controller 103 may control the display 101 to place the handwriting input at the center of the display 101. In addition, in response to the graphical object 101a rotating and being displayed, the controller 103 may control the display 101 to arrange the upper part to be consistent. Accordingly, a width of the graphical object 101a may be extended and displayed.

Figure 4A:
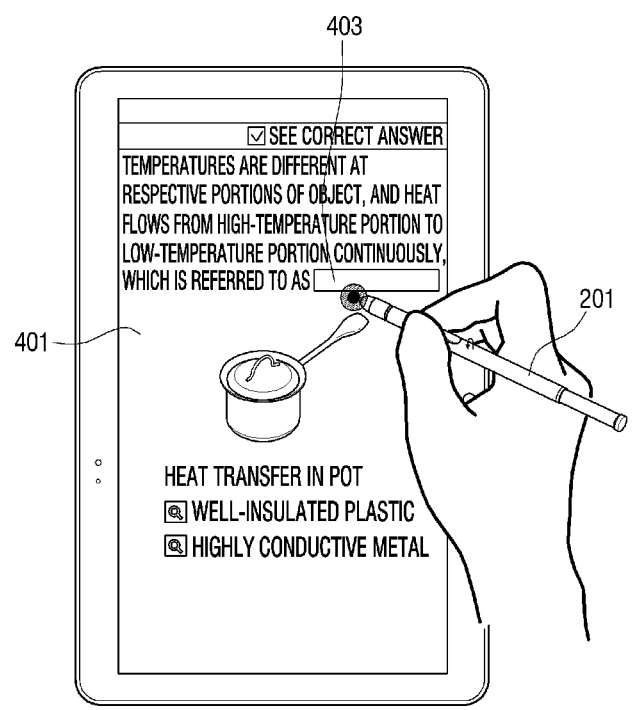
FIGS. 4A and 4B are views provided to describe an embodiment of inputting handwriting into a content having an input field by using the touch pen according to an embodiment of the present disclosure.
Figure 4B:
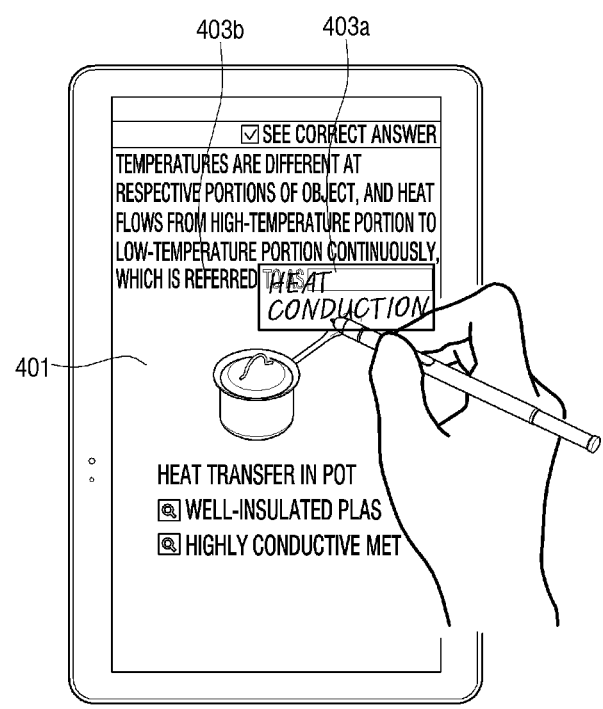

FIGS. 4A and 4B are views provided to describe an embodiment of inputting handwriting into a content having an input field by using the touch pen 201 according to an embodiment of the present disclosure.

Referring to FIGS. 4A and 4B, FIG. 4A illustrates a content 401 having an input field 403 in the display 101. In response to the user touching the input filed 403 by using the touch pen 201 or accessing the touch pen 201 to the input field 403, the controller 103 may control the display 101 to magnify and display the input filed 403. The content 401 may a graphical object having the input field 403. In response to a contact or access (hovering) of the touch pen 201 being sensed from the input field 403 while the content 401 having the input field 403 is displayed in the display 101, the controller 103 may provide a handwriting input layer 403a corresponding to the input field 403, as illustrated in FIG. 4B.

FIG. 4B illustrates the content 410 having the input field 403, the handwriting input layer 403a corresponding to the input field 403, and a handwriting image 403b. The size of the handwriting input layer 403a corresponding to the input field 403 may be equal to or larger than the size of the input field 403. The controller 103 may control the display 101 to display the handwriting input layer 403a in the input field 403 in an overlapping manner. The handwriting input layer 403a corresponding to the input field 403 may be displayed in the display 101 translucently. The transparency of the handwriting input layer 403a corresponding to the input field 403 may be predetermined or set by the user. The handwriting input layer 403a corresponding to the input field 403 may be partially located at a position of the input field 403 of the graphical object display layer.

In response to a touch sensing signal being received in the input field 403 while the content having the input field 403 is displayed, the controller 103 may control the display 101 to magnify and display the handwriting input layer 403a corresponding to the input field 403. In this case, the touch sensing signal may be output from the sensor 105 in response to the touch pen 201 coming into contact with the display 101. In addition, the touch sensing signal may be output from the sensor 105 in response to the user finger coming into contact with the display 101.

The controller 103 may sense the contact or access of the touch pen 201 with respect to the input field 403 while the content having the input field 403 is displayed in the graphical object display layer and control the display 101 to display the handwriting input layer 403a at a position corresponding to the input field 403 in an overlapping manner based on the sensed contact or access of the touch pen 201. The controller 103 may adjust the transparency of the handwriting input layer 403a to a predetermined value. In addition, the controller 103 may adjust the size of the handwriting input layer 403a to be equal to or larger than the size of the input field 403.

In response the user inputting the handwriting into the input field 403 through the handwriting input layer 403a, the controller 103 may control the display 101 to display the input handwriting image 403b in the handwriting input layer 403a. The handwriting image 403b may be converted into text in a character recognition module (not shown) and displayed in the input field 403.

Figure 5A:
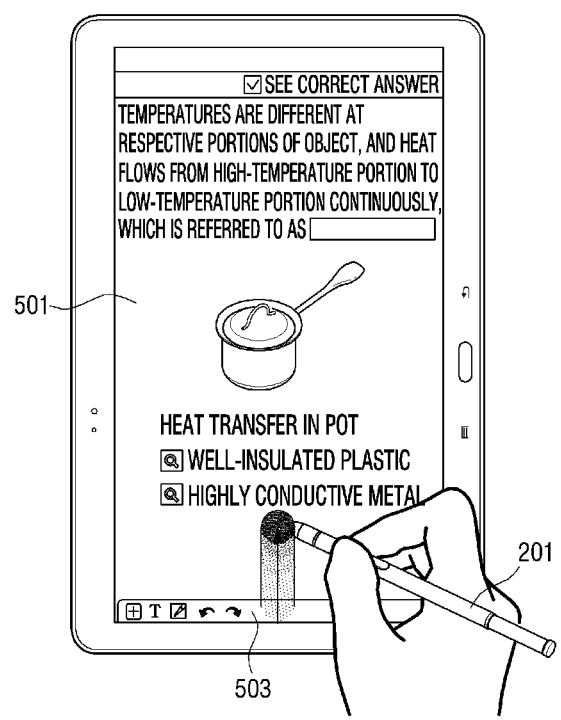
FIGS. 5A and 5B are views provided to describe an embodiment of dragging an edge area of the display where a content is displayed to display a memo window according to an embodiment of the present disclosure.
Figure 5B:
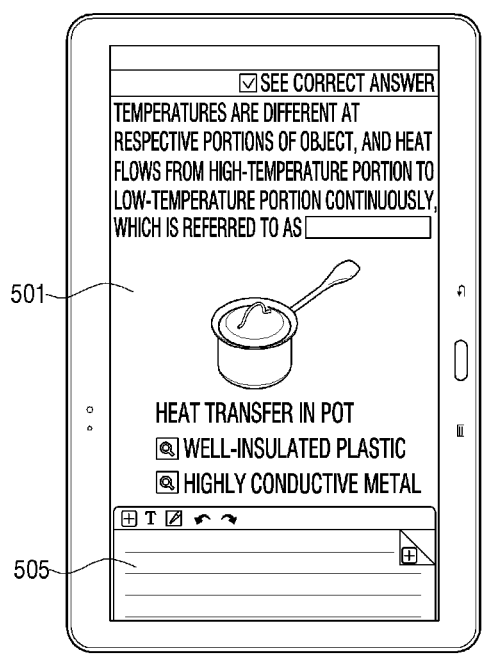

FIGS. 5A and 5B are views provided to describe an embodiment of dragging an edge area of the display 101 where a content is displayed to display a memo window according to an embodiment of the present disclosure.

Referring to FIGS. 5A and 5B, FIG. 5A illustrates a content 501 and an edge area 503. The edge area 503 may be an upper end, a lower end, a left end, and a right end of the display 101. In response to the user dragging the edge area 503 of the display 101 where the content 501 is displayed, the controller 103 may control the display 101 to display a memo window 505 for inputting the handwriting into the display 101.

FIG. 5B illustrates an example where the display 101 displays the content 501 and the memo window 505. In response to a drag operation of the touch pen 201 being sensed from the edge area 503 of the display 101, the controller 103 may control the display 101 to display the memo window 505. The user may input the handwriting into the electronic apparatus 100 through the memo window 505. The handwriting image input through the memo window 505 may be converted into the text or stored in the electronic apparatus 100 in a form of image. In this case, information on the content 501 may be stored together with the handwriting image. The content 501 may be displayed in the graphical object layer. The memo window 505 may be displayed in the handwriting input layer. The handwriting input layer may be smaller than the graphical object display layer. In response to a user input being sensed from the edge area 503 of the display 101 while the graphical object layer is displayed in the display 101, the controller 103 may control the display 101 to display the handwriting input layer at the position from which the user input was sensed. To be specific, in response to a signal based on a pen-drag gesture being input in the edge area 503 of the display 101 while the graphical object is displayed in the display 101, the controller 103 may control the display 101 to display a memo window for inputting a handwriting input in the edge area 503. The pen-drag gesture may be an operation of bringing the touch pen 201 into contact with the display 101 and moving the touch pen 201 while maintaining the contact. The sensor 105 may output the signal based on the pen-drag gesture.

Figure 6A:
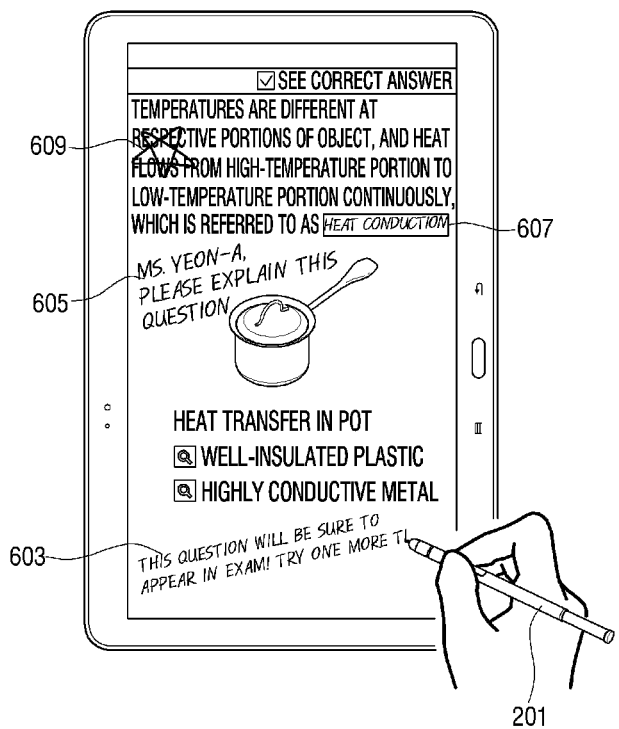
FIGS. 6A and 6B are views provided to describe an embodiment of identifying a user through recognition on a hand wring image and automatically setting a pen style according to an embodiment of the present disclosure.
Figure 6B:
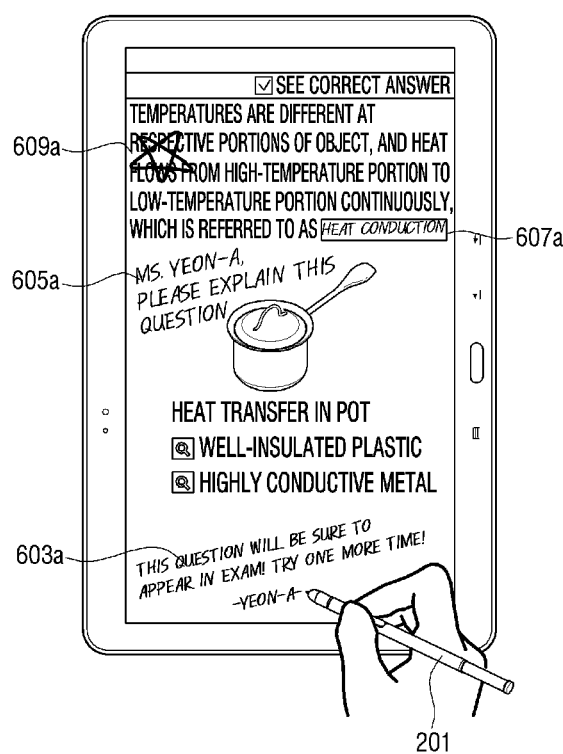

FIGS. 6A and 6B are views provided to describe an embodiment of identifying a user through recognition on a hand wring image and automatically setting a pen style according to an embodiment of the present disclosure.

Referring to FIG. 6A, the display 101 displays a content 601 and handwriting images 603, 605, 607, 609. The controller 103 may identify a user by analyzing writing of the handwriting input through the handwriting input layer and set a pen style automatically based on the analysis on the writing. At least one of the handwriting images 603, 605, 607, 609 may be input by different users. For example, the handwriting images 603, 607, 609 may be input by User A, and the handwriting image 605 may be input by User B.

The controller 103 may control the display 101 to display the handwriting images 603, 607, 609 in red. That is, controller 103 may control the display 101 to display in red the handwriting images 603, 607, 609 input by User A. The controller 103 may control the display 101 to display the handwriting imago 605 in yellow. That is, controller 103 may control the display 101 to display in yellow the handwriting imago 605 input by User B.

Referring to FIG. 6B, the display 101 displays handwriting images 603a, 605a, 607a, 609a displayed in different colors. A red-colored pen style may be applied to the handwriting images 603a, 607a, 609a. In addition, a yellow-colored pen style may be applied to the handwriting image 605a.

In addition, a pen style may be applied to the handwriting images 603a, 609a. A brush style may be applied to the handwriting image 605a. A pencil style may be applied to the handwriting image 607a.

In response to the user being identified by the analysis on the writing, the controller 103 may give the identified user a predetermined document edition authority. For example, in response to a certain user being identified as a student by the analysis on the handwriting image, the controller 103 may limit the edition of a document with respect to the user. In response to the user being identified as a teacher by the analysis on the handwriting image, the controller 103 may allow the edition of a document with respect to the user.

That is, the controller 103 may lock or unlock the graphical object display layer based on the handwriting image input into the handwriting input layer. Alternatively, the controller 103 may control the graphical object display layer based on the handwriting image input into the handwriting input layer.

Figure 7A:
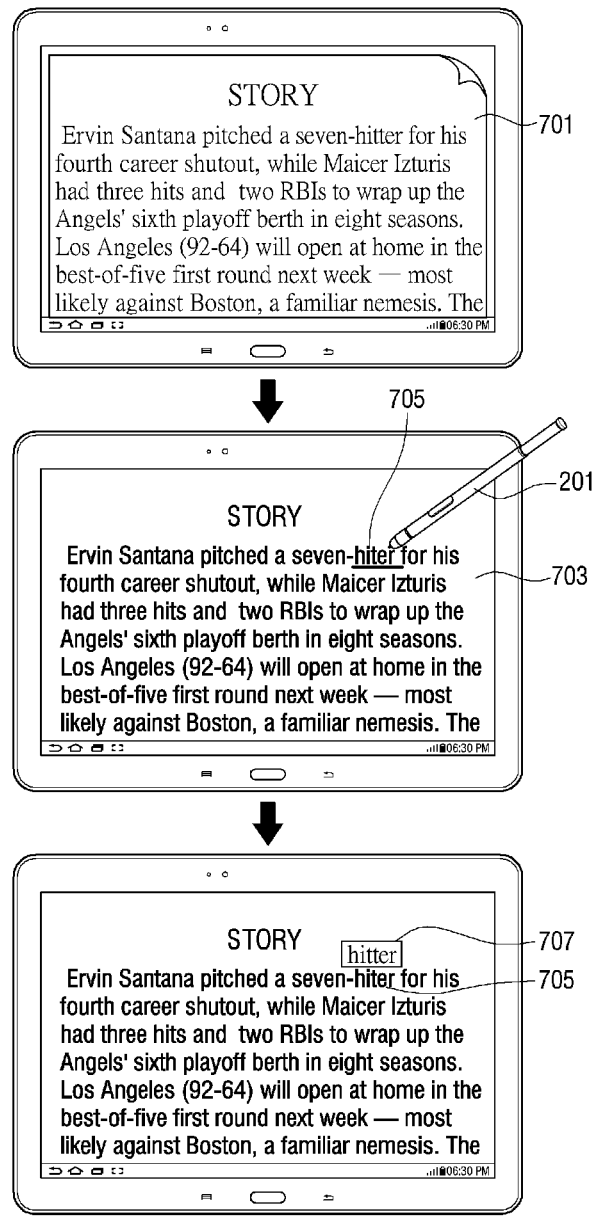
FIGS. 7A, 7B, and 7C are views provided to describe an example of an interaction of the touch pen while a document image is displayed in the display according to an embodiment of the present disclosure.
Figure 7B:
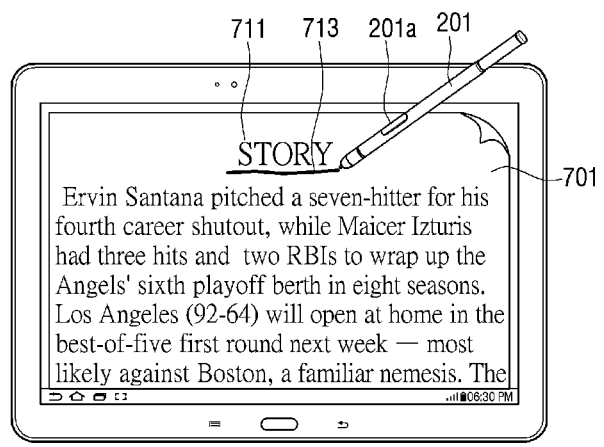
Figure 7B:
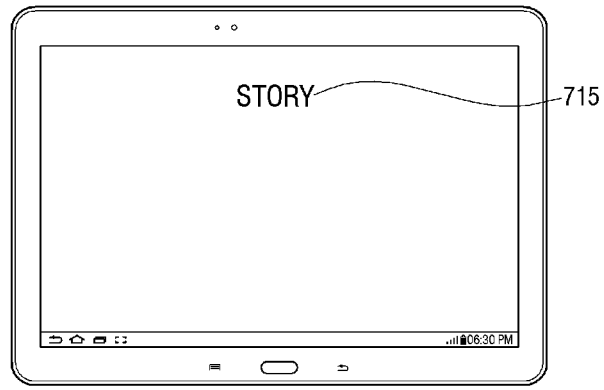
Figure 7C:
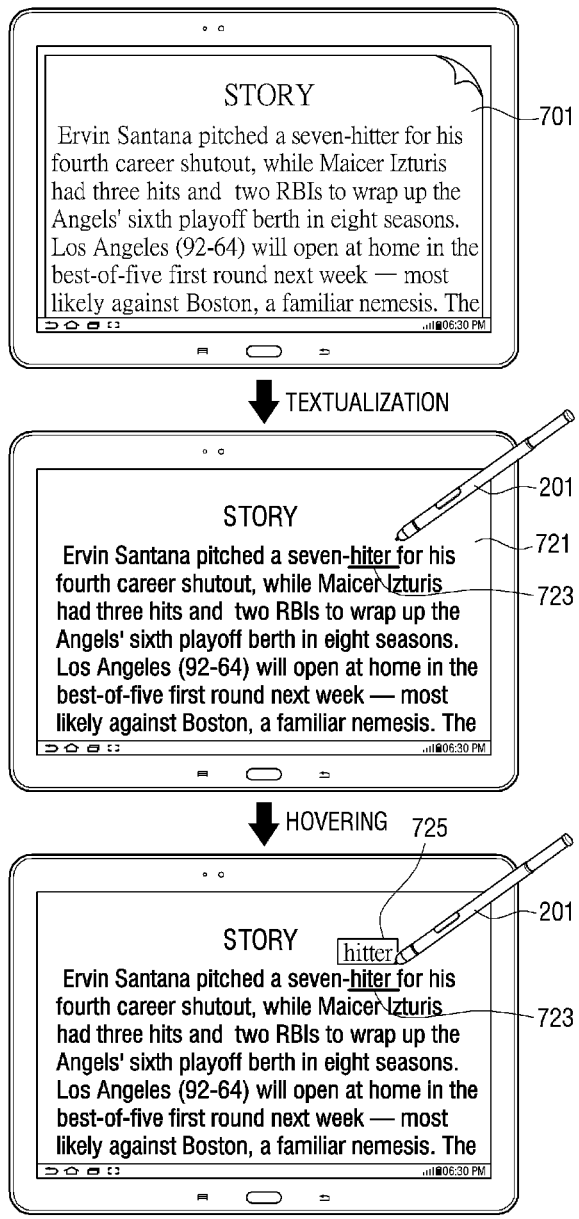

FIGS. 7A to 7C are views provided to describe an example of an interaction of the touch pen 201 while a document image is displayed in the display 101 according to an embodiment of the present disclosure.

Referring to FIGS. 7A to 7C, FIG. 7A illustrates a document image 701, a textualized document 703, a part of document 705, and a partial document image 707. The controller 103 may convert the document image 701 into the textualized document 703. In response to the user accessing the touch pen 201 to the part of document 705 or touching the part of document 705 by using the touch pen 201 while the textualized document 703 is displayed in the display 101, the controller 103 may control the display 101 to display the partial document image 707 corresponding to the part of document 705. In this case, the partial document image 707 may be displayed around the position from which the touch was sensed.

FIG. 7B illustrates the document image 701, a textualized document 715, a part of document image 711, an underline 713, and the touch pen 201. In response to the user performing a drag operation while pressing a button 201a of the touch pen 201 in order to convert a part of the document image 701 into text while the document image 701 is displayed in the display 101, the controller 103 may control the display 101 to display the underline 713 on the part of the document image 701 in an area from which the drag operation was sensed and may convert the part of the document image 701 into text. In response to the contact or hovering of the touch pen 201 being sensed while the document image 701 is displayed in the display 101, the controller 103 may determine the position from the contact or hovering was sensed. In response to the touch pen 201 being moved while maintaining the contact, the controller 103 may control the display 101 to display the underline 713 on a moving trajectory and may convert the document image around the underline 713 into text. The controller 103 may display the converted text document 715 in the display 101. In this case, only the part of document image 711 included in the document image 701 may be converted into text.

FIG. 7C illustrates the document image 701, a textualized document 721, an underline 723, and a partial document image 725. The controller 103 may convert the document image 701 into the textualized document 721. In response to the user accessing the touch pen 201 to a part of text (hovering) while the textualized document 721 is displayed in the display 101, the controller 103 may control the display 101 to display the partial document image 725 corresponding to the part of text. In this case, the partial document image 725 may be displayed around the position from which the hovering of the touch pen 201 was sensed. In addition, in response to the user touching the part of text by using the touch pen 201 while the textualized document 721 is displayed, the controller 103 may control the display 101 to display the partial document image 725 corresponding to the part of text. In this case, the partial document image 725 may be displayed around the position from which the contact of the touch pen 201 was sensed.

Figure 8:
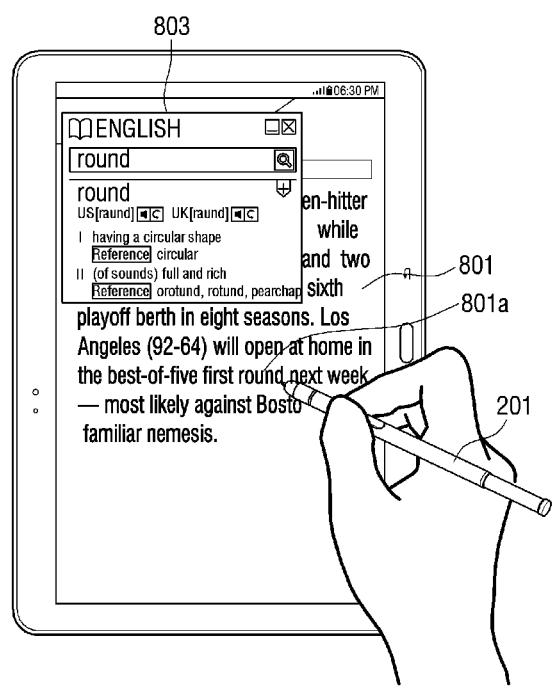
FIG. 8 is a view provided to describe an example of a hovering interaction of the touch pen according to an embodiment of the present disclosure.

FIG. 8 is a view provided to describe an example of a hovering interaction of the touch pen 201 according to an embodiment of the present disclosure.

Referring to FIG. 8, the display 101 displays a document 801, an application 803, and the touch pen 201. In response to the user accessing the touch pen 201 to the display 101 at an arbitrary position of a document displayed in the display 101, the controller 103 may sense the hovering from the arbitrary position of the document. The controller 103 may extract a character and number displayed at the position from which the hovering was sensed and call an application corresponding to the extracted character and number. In response to the application being called, the controller 103 may connect the extracted character and number to the application 803. That is, the controller 103 may use the extracted character and number as an input of the application. In addition, controller 103 may control the display 101 to display an execution result of the application obtained by inputting the extracted character and number into the application.

The application 803 may be a widget. The widget refers to a mini application which is one of the GUIs for facilitating an interaction between a user and an application or between the user and an operating system (OS). For example, the widget may include a dictionary widget, a weather widget, a calculator widget, a clock widget, a phone widget, etc.

In response to the user accessing the touch pen 201 to a certain word 801a while reading the document 801 displayed in the display 101, the controller 103 may control the display 101 to display a dictionary widget of the application 803. In addition, the controller 103 may input the selected word 801a into a search box of the dictionary widget of the application 803 and may control the display 101 to display the search result in the dictionary widget of the application 803. For example, in response to the user accessing the touch pen 201 to a word 'round,' the controller 103 may input the word 'round' into the dictionary widget of the application 803 and may control the display 101 to search a meaning of the word 'round' and display the search result in the dictionary widget of the application 803.

In addition, in response to the user accessing the touch pen 201 to a certain number while reading the document 801 displayed in the display 101, the controller 103 may execute an application or widget where the number may be used as an input.

For example, in response to the user accessing the touch pen 201 to numbers '01032634119,' the controller 103 may control the display 101 to display a phone widget and may make a phone call. According to another embodiment, in response to the user accessing the touch pen 201 to a certain number while reading the document 801 displayed in the display 101, the controller 103 may control the display 101 to display a calculator widget in the display 101.

Figure 9A:
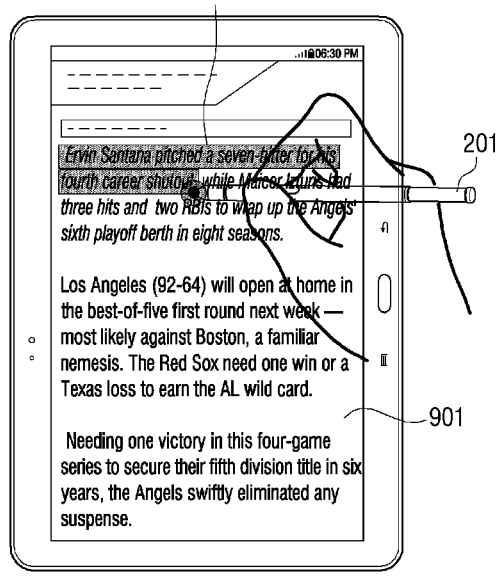
Figure 9A:
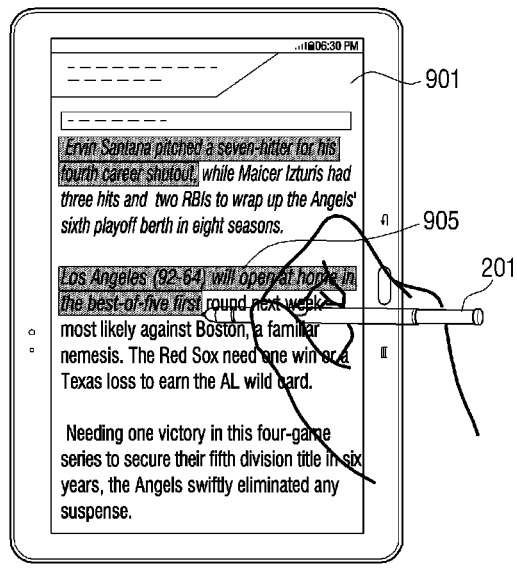

FIGS. 9A and 9B are views provided to describe a method for applying a format by using the touch pen 201 according to an embodiment of the present disclosure.

Referring to FIG. 9A, the display 101 displays a document 901, a first area 903, a second area 905, and the touch pen 201. A format may be applied to the document 901 displayed in the display 101. The first area 903 and the second area 905 may be a part of areas selected from the document.

The touch pen 201 may operate in a first mode or in a second mode. The touch pen 201 includes a button. In response to the user brining the touch pen 201 into contact with the display 101 without pressing the button, the touch pen 201 may operate in the first mode. In response to the user brining the touch pen 201 into contact with the display 101 while pressing the button, the touch pen 201 may operate in the second mode. In response to the touch pen 201 operating in the first mode, the controller 103 may receive a first signal from the touch pen 201. Alternatively, in response to the touch pen 201 operating in the first mode, the controller 103 may receive the first signal from the sensor 105.

In response to the touch pen 201 operating in the second mode, the controller 103 may receive a second signal from the touch pen 201. Alternatively, in response to the touch pen 201 operating in the second mode, the controller 103 may receive the second signal from the sensor 105.

In response to the user brining the touch pen 201 into contact with the first area 903 while pressing the button of the touch pen 201 and moving the touch pen 201 while the document 901 is displayed in the display 101, the controller 103 may select the first area 903 and copy a format applied to the first area 903. In this case, in response to the user brining the touch pen 201 into contact with the second area 905, the controller 103 may apply the format of the first area 903 to the second area 905.

In response to the second signal being received from the touch pen 201 and a user input being received from the first area 903 of the display 101 while the document 901 is displayed in the display 101, the controller 103 may acquire the format of the first area 903. In response to the user input being received from the second area 905 of the display 101 after the format of the first area 903 is acquired, the controller 103 may apply the format of the first area 903 to the second area 905.

For example, in response to the user performing a drag operation in the first area 903 while pressing the button of the touch pen 201 while the document 901 is displayed in the display 101, the controller 103 may select the first area 903. The selected first area 903 may be reversed or highlighted. In addition, the format of the selected first area 903 may be extracted. In response to the user performing the drag operation in the second area 905 while pressing the button of the touch pen 201, the controller 103 may apply the format of the first area 903 to the second format 905. That is, in response to a base color of the first area 903 being yellow, the controller 103 may control the display 101 to display a base color of the second area 905 in yellow. In response to a font of the first area 903 being a Gothic font, the controller 103 may control the display 101 to display a font of the second area 905 in the Gothic font. In response to the font of the first area 903 being an Italic font, the controller 103 may control the display 101 to display the font of the second area 905 in the Italic font.

FIG. 9B illustrates the document 901, a first area 913, a second area 917, a format list 915, and the touch pen 201. In response to the user brining the touch pen 201 into contact with the first area 913 while the document 901 is displayed in the display 101, the controller 103 may select the first area 913 and control the display 101 to highlight the selected area. The format list 915 applied to the first area 913 may be displayed around the first area 913 which come into contact with the touch pen 201. In response to the user brining the touch pen 201 into contact with the first area 913 and pressing the button of the touch pen 201, the controller 103 may control the display 101 to display the format list 915 applied to the first area 913 around the first area 913 which come into contact with the touch pen 201.

In response to the user selecting one of a plurality of formats included in the format list 915 by using the touch pen 201, moving the touch pen 201 to other position, and brining the touch pen 201 into contact with the second area 917 of the document 901, the controller 103 may apply the format applied to the second area 917. That is, the format of the first area 913 may be applied to the second area 917.

In response to the contact and movement of the touch pen 201 being sensed while the document is displayed in the display 101, the controller 103 may determine the first area 913 based on a moving distance of the touch pen 201. That is, in response to the drag operation by the touch pen 201 being received in the first area 913 of the document, the controller 103 may acquire the format applied to the first area 913 and control the display 101 to display the format list 915 applied to the first area 913 around the first area 913.

In response to a user input of selecting a format from among the plurality of formats in the format list 915 being received and the drag operation by the touch pen 201 being received from the second area 917, the controller 103 may control the display 101 to apply the selected format to the second area 917 and display the second area 917.

For example, in response to the user performing the drag operation in the first area 913 while the document 901 is displayed in the display 101, the format list 915 applied to the first area 913 may be displayed around the first area 913. In response to the user touching a format among the plurality of formats in the format list 915 by using the touch pen 201, the controller 103 may select the touched format. In this state, in response to the user performing the drag operation in the second area 917 by using the touch pen 201, the controller 103 may apply the selected format to the second area 917. In response to the selected format having a bold style, the second area 917 may be displayed in bold.

Figure 10A:
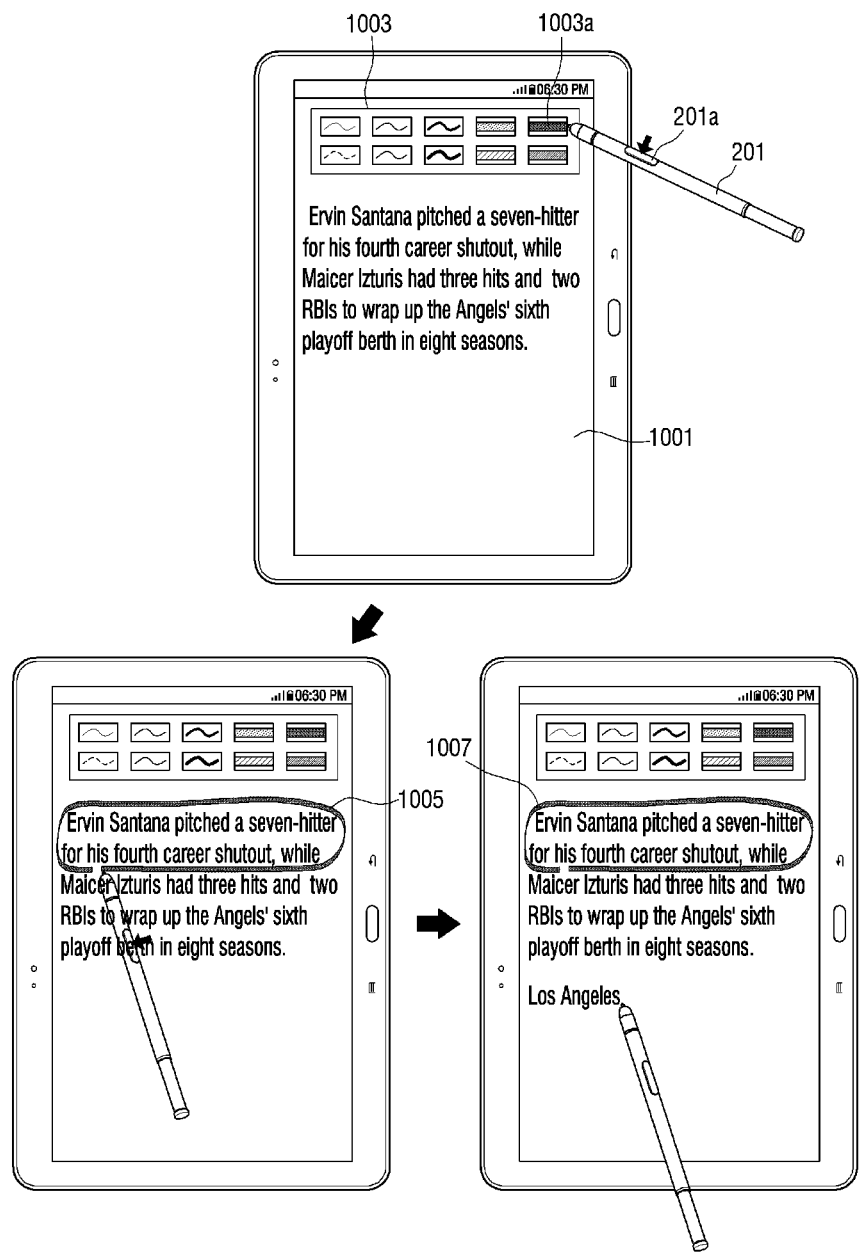
FIGS. 10A and 10B are views provided to describe a method for applying a format according to an embodiment of the present disclosure.
Figure 10B:
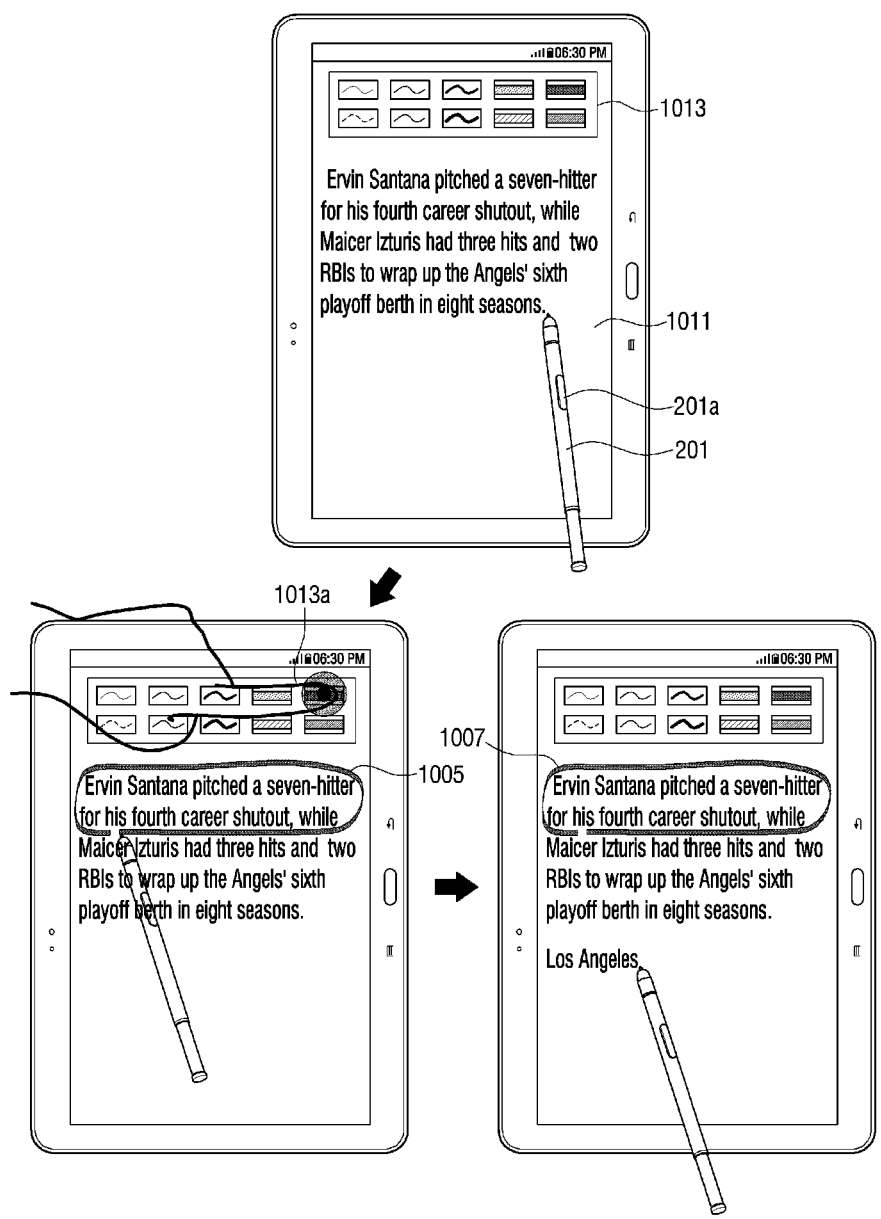

FIGS. 10A and 10B are views provided to describe a method for applying a format according to an embodiment of the present disclosure.

Referring to FIGS. 10A and 10B, FIG. 10A illustrates a document 1001, a format list 1003, a format 1003*a*, a selection area 1005, a format application area 1007, the touch pen 201, and the button 201*a*.

In response to the user pressing the button 201*a* of the touch pen 201, selecting a format 1003*a* from the format list 1003, and selecting a selection area 1005 to which the user wishes to apply the format while the document 1001 and the format list 1003 are displayed in the display 101, the controller 103 may apply the selected format 1003*a*. The display 101 may display the format application area 1007 to which the format was applied. In response to the user releasing button pressing of the touch pen 201, the controller 103 may remove the applied format 1003*a*. That is, the selected format 1003*a* may be applied only when the button 201*a* of the touch pen 201 is pressed.

In addition, in response to the user selecting the format 1003*a* from the format list 1003 and selecting the selection area 1005 to which the user wishes to apply the format while the document 1001 and the format list 1003 are displayed in the display 101, the controller 103 may apply the selected format 1003*a*. The display 101 may display the format application area 1007 to which the format was applied. The applied format 1003*a* may be applied continuously unless any release command is received. The selected format 1003*a* may be also applied when the user inputs the handwriting by using the touch pen 201.

FIG. 10B illustrates a document 1011, a format list 1013, a format 1013*a*, the selection area 1005, the format application area 1007, the touch pen 201, and the button 201*a*.

In response to the user touching the format 1013*a* in the format list 1013 by using the finger and selecting the selection area 1005 to which the user wishes to apply the format by using the touch pen 201 with maintaining the touch with respect to the format 1013*a* while the document 1011 and the format list 1013 are displayed in the display 101, the controller 103 may apply the selected format 1013*a*. The display 101 may display the format application area 1007 to which the format was applied. In response to the user releasing the finger touch, the controller 103 may remove the selected format 1003*a*. That is, the selected format may be applied in response to the user touching the format list 1013 by using the finger and maintaining the touch.

In response to a touch being sensed from the first area 1013 of the display 101 and another touch being sensed from the second area 1005 while the touch in the first area 1013 is maintained, the controller 103 may apply the format selected in the first area 1013 to the second area 1005. The first area 1013 may be a format list, and the second area 1005 may be a part of the document.

Figure 11:
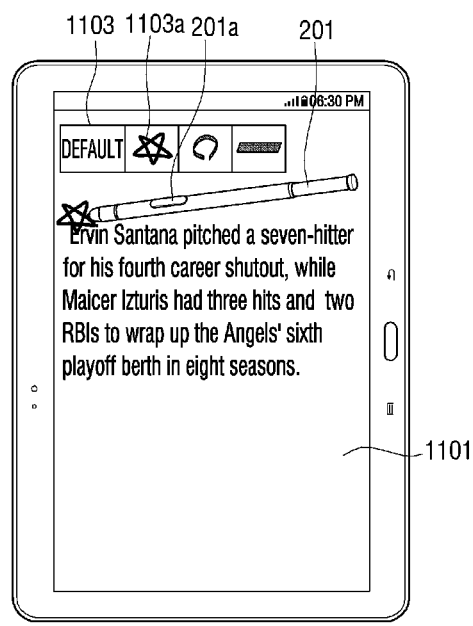
FIG. 11 is a view provided to describe a method for setting a user format according to an embodiment of the present disclosure.

FIG. 11 is a view provided to describe a method of setting a user format according to an embodiment of the present disclosure. FIG. 11 illustrates a document 1101, a user-designated format list 1103, a user-selected format 1103*a*, the touch pen 201, and a button 102*a*.

Referring to FIG. 11, the user may store and manage a certain format of the touch pen 201 to be used for a particular purpose. That is, the user may store a user-designated format in the user-designated format list 1103 and call the format according to the need.

In response to the user calling the user-designated format list 1103 while the document 1101 is displayed in the display 101, the controller 103 may control the display 101 to display the user-designated format list 1103 in the upper part of the screen. The user-designated format list 1103 may include a format that the user uses frequently. In response to the user selecting the user-selected format 1103*a* from the user-designated format list 1103 and performing the handwriting by using the touch pen 201, the controller 103 may apply the user-selected format 1103*a*. Alternatively, in response to the user selecting a particular area from the document 1101, the controller may apply the user-selected format 1103*a*.

Figure 12A:
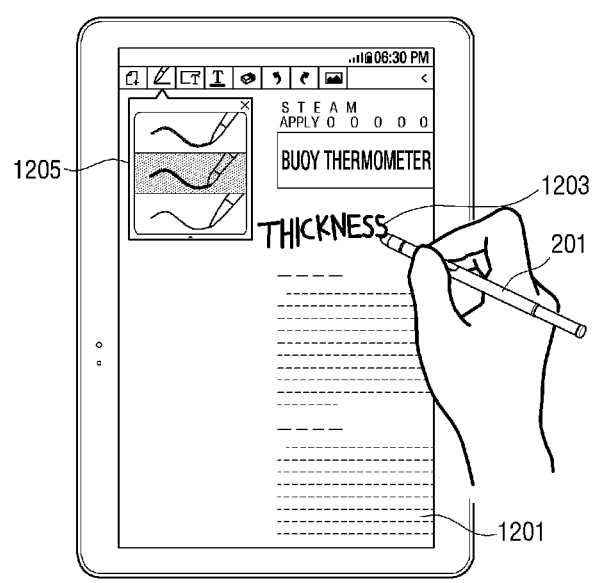
FIGS. 12A, 12B, and 12C are views provided to describe an embodiment of magnifying a format menu of the touch pen according to a magnification of a screen according to an embodiment of the present disclosure.
Figure 12B:
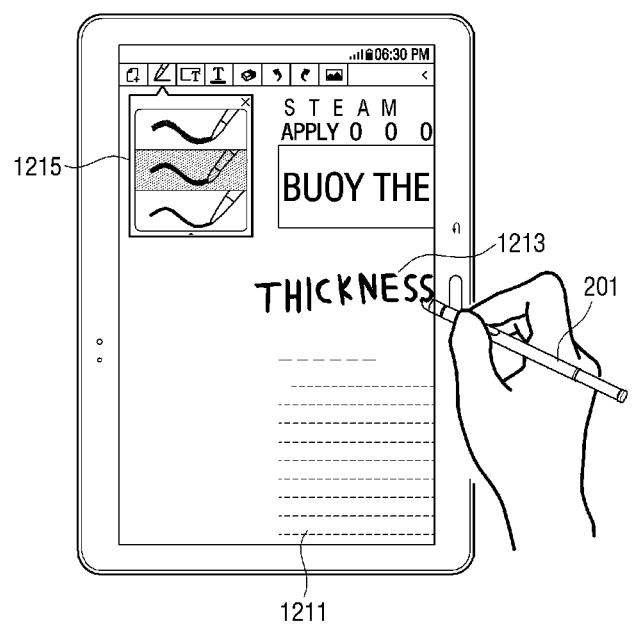
Figure 12C:
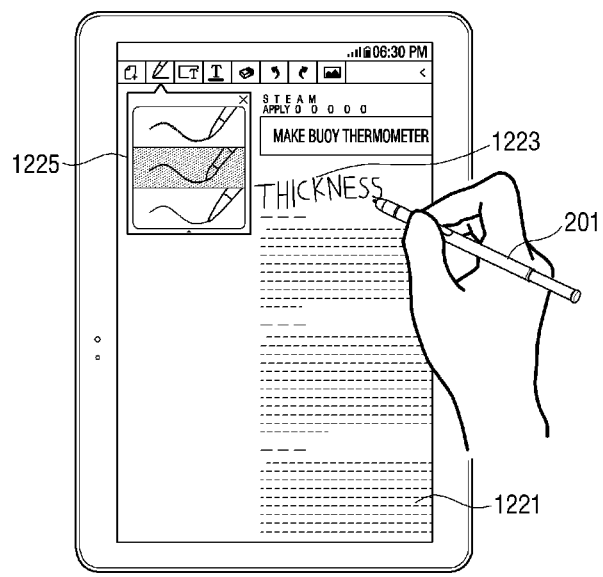

FIGS. 12A to 12C are views provided to describe an embodiment of magnifying a format menu of the touch pen 201 according to a magnification of a screen according to an embodiment of the present disclosure.

Referring to FIGS. 12A to 12C, FIG. 12A illustrates a document 1201, a handwriting image 1203, a format list 1205, and the touch pen 201. The display 101 displays the document 1201 in an original magnification. The controller 103 may determine a display magnification of the format list 1205 based on the magnification of the document 1201 displayed in the display 101. In response to the document 1201 being displayed in an original size in the display 101, the controller 103 may control the display 101 to display the format list 1205 in an original size. In this case, the handwriting image 1203 may be also displayed in an original size.

FIG. 12B illustrates a document 1211, a handwriting image 1213, a format list 1215, and the touch pen 201. The display 101 may magnify and display the document 1211 by 200% of the original magnification. The controller 103 may determine the display magnification of the format list 1215 based on the magnification of the document 1211 displayed in the display 101. In response to the document 1211 being displayed in 200% of the original magnification in the display 101, the controller 103 may control the display 101 to magnify and display the format list 1215 by 200% of the original magnification. The handwriting image 1203 may be also magnified and displayed by 200% of the original magnification.

FIG. 12C illustrates a document 1221, a handwriting image 1223, a format list 1225, and the touch pen 201. The display 101 may reduce and display the document 1221 by 50% of the original magnification. The controller 103 may determine the display magnification of the format list 1225 based on the magnification of the document 1221 displayed in the display 101. In response to the document 1221 being displayed in 50% of the original magnification in the display 101, the controller 103 may control the display 101 to reduce and display the format list 1225 by 50% of the original magnification. The handwriting image 1223 may be also reduced and displayed by 50% of the original magnification.

That is, in response to a user input of displaying a format of the touch pen 201 being received while a content is displayed in the display 101, the controller 103 may determine the magnification of the content displayed in the display 101 and control the display 101 to display the format of the touch pen 201 based on the determined magnification.

Figure 13A:
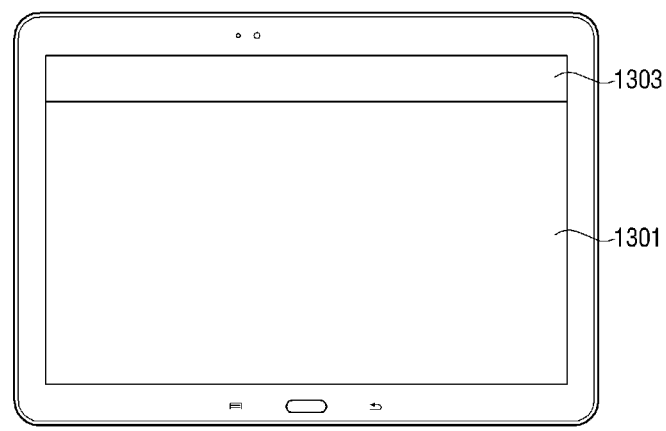
FIGS. 13A, 13B, and 13C are views provided to describe a method for converting a handwriting input mode and a gesture input mode by using the touch pen according to an embodiment of the present disclosure.
Figure 13B:
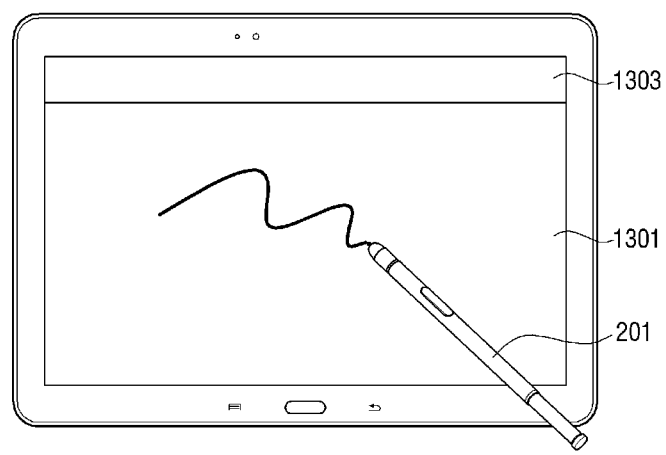
Figure 13C:
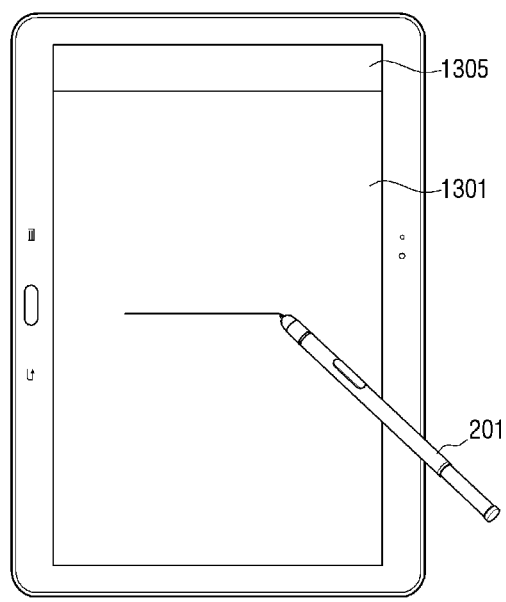

FIGS. 13A to 13C are views provided to describe a method for converting a handwriting input mode and a gesture input mode by using the touch pen 201 according to an embodiment of the present disclosure.

Referring to FIGS. 13A to 13C, in the handwriting input mode, the input of the touch pen 201 may be recognized as the handwriting image. In the gesture input mode, the input of the touch pen 201 may be recognized as a command to execute a particular function. For example, in the handwriting input mode, in response to the user inputting the handwriting into the display 101 by using the touch pen 201, the controller 103 may recognize the input handwriting as the handwriting image and convert the input handwriting into corresponding text. In the gesture input mode, in response to the user drawing a triangle in the display 101 by using the touch pen 201, the controller 103 may play back music. In response to the user drawing a square in the display 101 by using the touch pen 201 while the music is played back, the controller 103 may stop the playback.

FIG. 13A illustrates a first area 1301 and a second area 1303 of the display 101. In response to a signal based on the contact of the touch pen 201 being received in the display 101, the controller 103 may divide the display 101 into the first area 1301 and the second area 1303 based on a direction of the electronic apparatus 100. That is, in response to touch information by the touch pen 201 being received in the display 101, the controller 103 may divide the display 101 into the first area 1301 and the second area 1303 based on the direction of the electronic apparatus 100.

The controller 103 may determine the first area 1301 and the second area 1303 based on the direction of the electronic apparatus 100. The controller 103 may determine an upper area of the display 101 as the second area 1303. In the first area 1301, the controller 103 may receive the signal based on the contact of the touch pen 201 and may do not receive or may ignore a signal based on a touch of a finger. In the second area 1303, the controller 103 may receive the signal based on the touch of the finger.

FIG. 13B illustrates the first area 1301, the second area 1303, and the touch pen 201. In response to a signal based on a user input not being received in the second area 1303, the controller 103 may set the first area 1301 as a first mode. The first mode may be the handwriting input mode. In response to the signal based on the input of the touch pen 201 being received in the first area 1301, the controller 103 may control the display 101 to display the handwriting image based on the received signal.

In response to the signal based on the user input being received in the second area 1303, the controller 103 may set the first area 1301 as a second mode. The second mode may be the gesture input mode. In response to the signal based on the input of the touch pen 201 being received in the second area 1303, the controller 103 may determine a gesture based on the received signal and control to execute a command or function corresponding to the determined gesture.

FIG. 13C illustrates the first area 1301, a second area 1305, and the touch pen 201. The controller 103 may determine the first area 1301 and the second area 1305 by considering the direction of the electronic apparatus 100. A position of the second area 1305 may vary according to whether the direction of the electronic apparatus 100 is a horizontal direction or a vertical direction. In response to the signal based on the input of the touch pen 201 being received in the display 101, the controller 103 may determine the first area 1301 and the second area 1305 based on the direction of the electronic apparatus 100. The controller 103 may inactivate a touch input of a finger in the first area 1301 and activate the touch input of the finger in the second area 1305.

Figure 14:
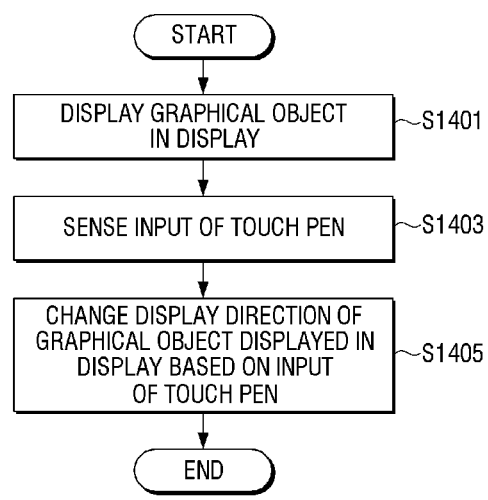
FIG. 14 is a flowchart provided to describe a method for changing a display direction of a graphical object displayed in the display based on an input of the touch pen.

FIG. 14 is a flowchart provided to describe a method for changing a display direction of a graphical object displayed in the display 101 based on an input of the touch pen 201 according to an embodiment of the present disclosure.

Referring to FIG. 14, the electronic apparatus 100 displays a graphical object in the display 101 at operation 51401. In this case, the graphical object may be displayed in a graphical object display layer. The graphical object display layer may display a character, an icon and button for executing a content application, etc.

The electronic apparatus 100 may sense an input of the touch pen 201 in the display 101 at operation 51403. The display 101 may display the graphical object display layer and a handwriting input layer. The electronic apparatus 100 may display a handwriting image in the handwriting input layer based on the input of the touch pen 201. In response to the user inputting the handwriting into the display 101 by using the touch pen 201 while the graphical object is displayed in the display 101, the electronic apparatus 100 may display the handwriting image in the handwriting input layer.

The electronic apparatus 100 may change the display direction of the graphical object displayed in the display 101 based on the input of the touch pen 201 at operation S 1405. In response to the user inputting the handwriting into the display 101 by using the touch pen 201, the electronic apparatus 100 may receive a signal based on the contact of the touch pen 201 from the sensor 105. The electronic apparatus 100 may determine an angle between the touch pen 201 and the display 101 and a direction by processing the received signal. That is, the electronic apparatus 100 may determine a tilt angle and direction of the touch pen 201. The tilt angle and direction of the touch pen 201 may be tilt information of the touch pen 201. The electronic apparatus 100 may determine a direction of a handwriting input of the touch pen 201 by using the tilt information of the touch pen 201 and determine the display direction of the graphical object based on the direction of the handwriting input.

The touch pen 201 may output status information, such as, the tilt information of the touch pen 201, autonomously. The electronic apparatus 100 may receive a signal output from the touch pen 201 and determine the tilt information of the touch pen 201 based on the received signal.

The electronic apparatus 100 may determine a tilt direction of the touch pen 201 based on the tilt information of the touch pen 201 and determine the display direction of the graphical object based on the tilt direction of the touch pen 201.

The electronic apparatus 100 may rotate the display direction of the graphical object so that the tilt direction of the touch pen 201 and the display direction of the graphical object become opposite to each other.

The electronic apparatus 100 may display the handwriting image in the second layer based on the input of the touch pen 201. In addition, the electronic apparatus 100 may display the graphical object in the first layer and display the handwriting image displayed based on the input of the touch pen 201 in the second layer.

The electronic apparatus 100 may fix the second layer and rotate or fix a display direction of the first layer based on the tilt direction of the touch pen 201.

The screen displayed in the display 101 may include the first layer and the second layer. The first layer may be the graphical object display layer, and the second layer may be a touch pen input layer. The electronic apparatus 100 may display the graphical object in the first layer and receive a signal based on the input of the touch pen 201 through the second layer. The electronic apparatus 100 may display the handwriting image in the second layer based on the input of the touch pen 201. In addition, the electronic apparatus 100 may change the display direction of the graphical object displayed in the first layer based on the input of the touch pen 201.

The electronic apparatus 100 may determine the tilt direction of the touch pen 201 based on the input of the touch pen 201 and may change the display direction of the graphical object displayed in the first layer based on the tilt direction of the touch pen 201.

The electronic apparatus 100 may fix a direction of the second layer although the display direction of the graphical object is changed.

According to the various embodiments, an apparatus may include a processor, a memory for storing and executing program data, a permanent storage, for example, a disk drive, a communication port for communicating with an external apparatus, and a user interface apparatus, for example, a touch panel, a key, a button, etc. The methods realized as a software module or an algorithm may be stored in a computer readable recording medium in a form of computer readable codes or program commands which are executable in the processor. In this case, the computer readable recording medium may include a magnetic storage medium (for example, read only memory (ROM), random access memory (RAM), floppy disk, hard disk, etc.) and an optical reader (for example, compact disc ROM (CD-ROM), digital versatile disc (DVD), etc.) The computer readable recording medium may store and execute a code which is distributed to computer systems interconnected through a network and is readable by a computer in a distribution method. The medium may be read by the computer, stored in a memory, and executed in the processor.

The present embodiments may be expressed by functional blocks and various processing operations. The functional blocks may be realized as various numbers of hardware and/or software elements for performing particular functions. For example, the various embodiments may employ integrated circuits, such as, memory, processing, logic, look-up table, etc. The integrated circuits may perform diverse functions according to control of one or more microprocessors or other control devices. As the elements may be executed as software programming or software elements, the present embodiments may include diverse algorithms realized through a combination of a data structure, processes, routines, or other programming elements and may be realized as a programming language or scripting language, such as, C, C++, Java, assembler, etc. The functional aspects may be realized as an algorithm executed in one or more processors. In addition, the present embodiments may employ the related art for electronic configuration, signal processing, and/or data processing. The terms 'mechanism,' 'element,' 'means,' and 'component' may be interpreted broadly and are not limited to a mechanical and physical component. The terms may include the meaning of a series of processing operations of software (routines) in connection with a processor and the like.

The particular performances described in the present embodiments are only the examples and do not limit the technical scope of the present disclosure in any aspects. For conciseness of the specification, the descriptions on the electronic components, control systems, software, and other functional aspects of the systems in the related art may be omitted. In addition, connections of lines between the elements shown in the accompanying drawings or connecting members thereof are provided to exemplify a functional connection and/or a physical or circuit connection. In an actual apparatus, the connections or the connecting members may be represented by a variety of replaceable or additional functional connections, physical connections, or circuit connections.

In the present disclosure (in particular, in the claims), the term 'the' or 'said' and other similar referring terms may pertain to both of a singular form and a plural form. A range in the descriptions includes individual values which belong to the range (unless otherwise defined), and thus, it will be understood that the detailed description discloses respective individual values in the range. The operations of the methods may be performed in a proper order unless the order is specified obviously or any contrary description exits, which is not limited to the order of the operations. Examples or exemplificative terms (for example, 'etc.') in the present disclosure are provided to describe the technical concept specifically, and thus, the technical scope of the present disclosure is not limited by the examples or exemplificative terms unless the technical scope is limited by the claims. In addition, it will be understood by those skilled in the art that the present disclosure may conform to design conditions and factors within the range of the claims to which various modifications, combinations, and changes are applied and the equivalents thereof.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic apparatus comprising:
   a transceiver;
   a sensor configured to:
      sense an input of a touch pen, and
      output a signal corresponding to the input of the touch pen;
   a display; and
   at least one processor configured to:
      control the display to display at least one graphical object,
      in response to receiving the signal corresponding to the input of the touch pen on the display, control the display to display a handwriting image corresponding to the input of the touch pen while the at least one graphical object is displayed,
      determine a display direction of the at least one graphical object displayed in the display based on an input direction of the touch pen to generate the handwriting image, and
      control the display to display the at least one graphical object to be rotated based on the determined display direction of the at least one graphical object while a display direction of the handwriting image is maintained.

2. The electronic apparatus as claimed in claim 1, wherein the at least one processor is further configured to determine tilt information of the touch pen based on the signal.

3. The electronic apparatus as claimed in claim 1, wherein the at least one processor is further configured to:
   receive a signal output from the touch pen through the transceiver, and
   determine tilt information of the touch pen based on the signal output from the touch pen.

4. The electronic apparatus as claimed in claim 1, wherein the at least one processor is further configured to:
   determine a tilt direction of the touch pen based on tilt information of the touch pen, and
   determine the display direction of the at least one graphical object based on the tilt direction of the touch pen.

5. The electronic apparatus as claimed in claim 4, wherein the at least one processor is further configured to control the display to change the display direction of the at least one graphical object so that the tilt direction of the touch pen and the display direction of the at least one graphical object become opposite to each other.

6. The electronic apparatus as claimed in claim 5, wherein the at least one processor is further configured to:
   control the display to display the at least one graphical object in a first layer, and
   display the handwriting image displayed based on the input of the touch pen in a second layer.

7. The electronic apparatus as claimed in claim 6, wherein the at least one processor is further configured to:
   control the display to fix the second layer, and
   change the display direction of the at least one graphical object in the first layer based on the tilt direction of the touch pen.

8. An electronic apparatus comprising:
   a sensor configured to:
      sense an input of a touch pen, and
      output a signal corresponding to the input of the touch pen;
   a display configured to:
      include a first layer and a second layer,
      display at least one graphical object in the first layer, and
      in response to receiving the signal corresponding to the input of the touch pen on the display, display a handwriting image corresponding to the input of the touch pen in the second layer while the at least one graphical object is displayed in the first layer; and
   at least one processor configured to:
      determine a display direction of the at least one graphical object displayed in the first layer of the display based on an input direction of the touch pen to generate the handwriting image, and
      control the display to display the at least one graphical object to be rotated based on the determined display direction of the at least one graphical object while a display direction of the handwriting image is maintained.

9. The electronic apparatus as claimed in claim 8, wherein the at least one processor is further configured to:
   determine a tilt direction of the touch pen based on the signal output from the sensor, and
   control the display to change the display direction of the at least one graphical object displayed in the first layer according to the tilt direction of the touch pen.

10. The electronic apparatus as claimed in claim 9, wherein the at least one processor is further configured to control the display to maintain a direction of the second layer without change despite a direction of the first layer being changed.

11. A method for displaying a graphical object on a display of an electronic apparatus, the method comprising:
   sensing an input of a touch pen;
   in response to receiving to the input of the touch pen on the display, displaying a generated handwriting image corresponding to the input of the touch pen while at least one graphical object is displayed on the display;
   determining a display direction of the at least one graphical object displayed on the display based on an input direction of the touch pen during generation of the generated handwriting image; and
   controlling the display to display the at least one graphical object to be rotated based on the determined display direction of the at least one graphical object while a display direction of the generated handwriting image is maintained.

12. The method as claimed in claim 11, wherein the controlling of the display direction of the at least one graphical object comprises determining tilt information of the touch pen based on a signal corresponding to the input of the touch pen.

13. The method as claimed in claim 11, further comprising:
   receiving a signal output from the touch pen, wherein tilt information of the touch pen is determined based on the signal.

14. The method as claimed in claim 11, wherein the controlling of the display direction of the at least one graphical object comprises:
   determining a tilt direction of the touch pen based on tilt information of the touch pen, and
   determining the display direction of the at least one graphical object based on the tilt direction of the touch pen.

15. The method as claimed in claim 14, wherein the controlling of the display direction of the at least one graphical object comprises changing the display direction of the at least one graphical object so that the tilt direction of the touch pen and the display direction of the at least one graphical object become opposite to each other.

16. The method as claimed in claim 15, further comprising:
   displaying the generated handwriting image based on the input of the touch pen,
   wherein the at least one graphical object is displayed in a first layer, and
   wherein the generated handwriting image, which is displayed based on the input of the touch pen, is displayed in a second layer.

17. The method as claimed in claim 16, wherein the controlling of the display direction of the at least one graphical object comprises:
   fixing the second layer, and
   changing the at least one display direction of the graphical object in the first layer based on the tilt direction of the touch pen.

18. A method for displaying a graphical object on a display of an electronic apparatus, the method comprising:
   displaying at least one graphical object in a first layer on the display;
   sensing an input of a touch pen;
   in response to receiving the signal corresponding to the input of the touch pen on the display, displaying a handwriting image corresponding to the input of the touch pen in a second layer of the display while the at least one graphical object is displayed in the first layer of the display;
   determining a display direction of the at least one graphical object displayed in the first layer based on an input direction of the touch pen during generation of the generated handwriting image; and
   controlling the display to display the at least one graphical object to be rotated based on the determined display direction of the at least one graphical object while a display direction of the generated handwriting image is maintained.

19. The method as claimed in claim 18, wherein the controlling of the display direction of the at least one graphical object comprises:
   determining a tilt direction of the touch pen based on the input of the touch pen, and
   changing the display direction of the at least one graphical object displayed in the first layer according to the tilt direction of the touch pen.

20. The method as claimed in claim 19, further comprising maintaining a direction of the second layer without change despite the display direction of the at least one graphical object being changed.

* * * * *